US012809520B2

(12) United States Patent
Mirichigni et al.

(10) Patent No.: US 12,809,520 B2
(45) Date of Patent: Nov. 24, 2026

(54) FULL DUPLEX MEMORY SYSTEM

(71) Applicant: Micron Technology, Inc., Boise, ID (US)

(72) Inventors: Graziano Mirichigni, Vimercate (IT); Emanuele Confalonieri, Lesmo (IT)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 19/081,580

(22) Filed: Mar. 17, 2025

(65) Prior Publication Data

US 2025/0328247 A1 Oct. 23, 2025

Related U.S. Application Data

(60) Provisional application No. 63/636,021, filed on Apr. 18, 2024.

(51) Int. Cl.
*G06F 3/06* (2006.01)

(52) U.S. Cl.
CPC ............ *G06F 3/061* (2013.01); *G06F 3/0659* (2013.01); *G06F 3/0673* (2013.01)

(58) Field of Classification Search
CPC ...... G06F 3/061; G06F 3/0659; G06F 3/0673; G11C 16/08; G11C 16/30
See application file for complete search history.

(56) References Cited

U.S. PATENT DOCUMENTS 7,299,313 B2 * 11/2007 Gower ................ G06F 13/1684 710/24
2003/0053360 A1 * 3/2003 Agata .................... G11C 5/063 365/203
2007/0055814 A1 * 3/2007 Jeddeloh ............ G06F 13/4243 710/22
2015/0332746 A1 * 11/2015 Shaeffer ................... G11C 5/04 365/230.02
2022/0229790 A1 * 7/2022 Nale ................... G06F 13/1626
2023/0297520 A1 * 9/2023 Thanos ................... G06F 13/28 711/154

* cited by examiner

*Primary Examiner* — Aracelis Ruiz
(74) *Attorney, Agent, or Firm* — Harrity & Harrity, LLP

(57) ABSTRACT

In some implementations, a memory device may receive a read command instructing the memory device to read a first set of host data stored at a memory component that is associated with a memory component rank, of multiple memory component ranks associated with a channel. The memory device may read, via the channel based on receiving the read command, the first set of host data using a read-only interface associated with the memory component. The memory device may receive a write command instructing the memory device to write a second set of host data to the memory component. The memory device may write, via the channel and based on receiving the write command, the second set of host data to the memory component using a write-only interface associated with the memory component.

20 Claims, 12 Drawing Sheets

FULL DUPLEX MEMORY SYSTEM

CROSS-REFERENCE TO RELATED APPLICATION

This Patent Application claims priority to U.S. Provisional Patent Application No. 63/636,021, filed on Apr. 18, 2024, entitled "FULL DUPLEX MEMORY SYSTEM," and assigned to the assignee hereof. The disclosure of the prior Application is considered part of and is incorporated by reference into this Patent Application.

TECHNICAL FIELD

The present disclosure generally relates to memory devices, memory device operations, and, for example, to a full duplex memory system.

BACKGROUND

Memory devices are widely used to store information in various electronic devices. A memory device includes memory cells. A memory cell is an electronic circuit capable of being programmed to a data state of two or more data states. For example, a memory cell may be programmed to a data state that represents a single binary value, often denoted by a binary "1" or a binary "0." As another example, a memory cell may be programmed to a data state that represents a fractional value (e.g., 0.5, 1.5, or the like). To store information, an electronic device may write to, or program, a set of memory cells. To access the stored information, the electronic device may read, or sense, the stored state from the set of memory cells.

Various types of memory devices exist, including random access memory (RAM), read only memory (ROM), dynamic RAM (DRAM), static RAM (SRAM), synchronous dynamic RAM (SDRAM), ferroelectric RAM (FeRAM), magnetic RAM (MRAM), resistive RAM (RRAM), holographic RAM (HRAM), flash memory (e.g., NAND memory and NOR memory), and others. A memory device may be volatile or non-volatile. Non-volatile memory (e.g., flash memory) can store data for extended periods of time even in the absence of an external power source. Volatile memory (e.g., DRAM) may lose stored data over time unless the volatile memory is refreshed by a power source. In some examples, a memory device may be associated with a compute express link (CXL). For example, the memory device may be a CXL compliant memory device and/or may include a CXL interface.

DETAILED DESCRIPTION

Figure 1:
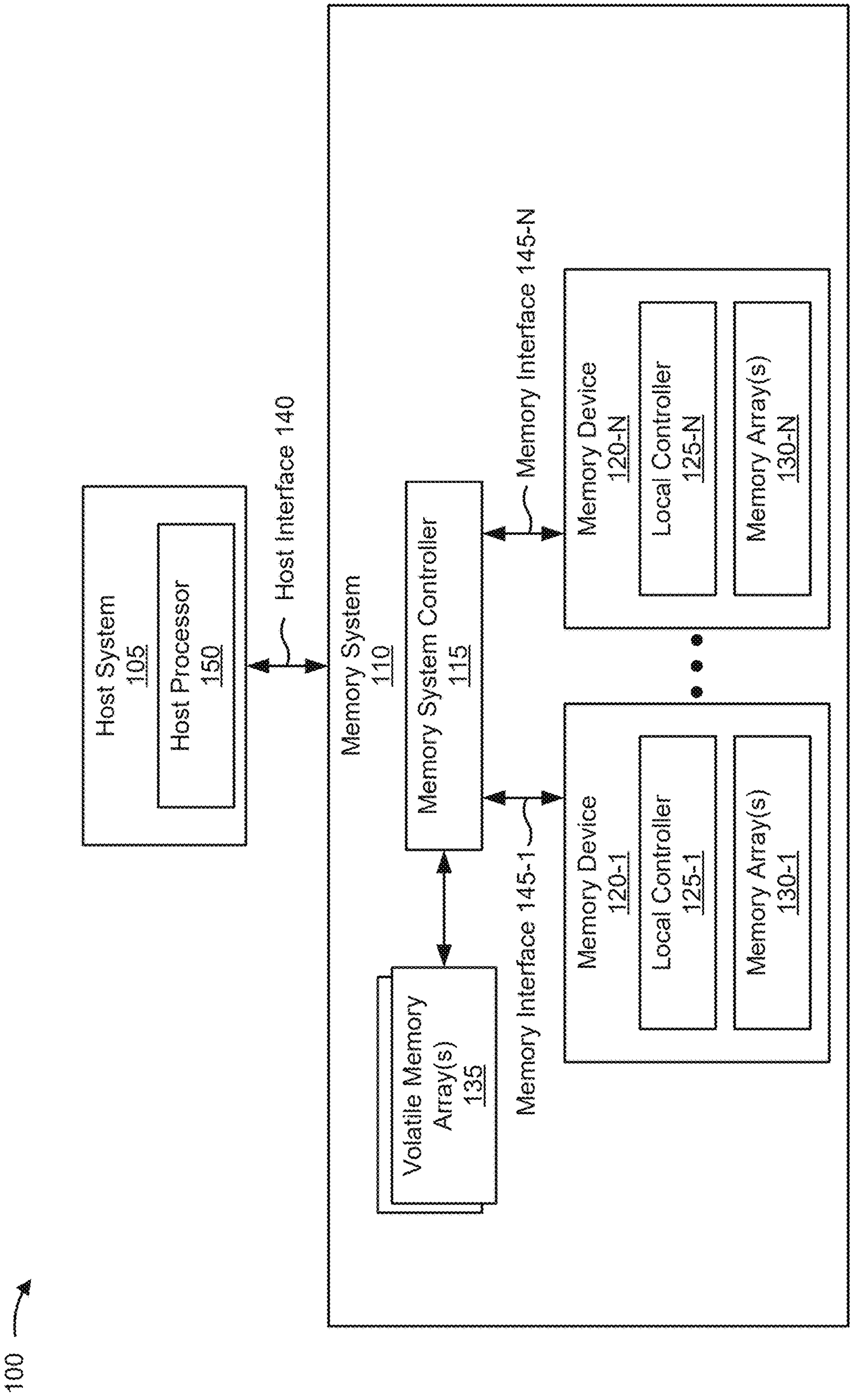
FIG. 1 is a diagram illustrating an example system that may be implemented as a full duplex memory system.

Certain applications require high-performance and/or high-capacity memory systems. For example, datacenters or similar applications may require high-performance and/or high-capacity memory systems, such as high-performance and/or high-capacity compute express link (CXL) compliant memory systems (sometimes referred to as CXL memory for ease of discussion). In some aspects, a CXL memory may be based on a double data rate (DDR) memory component, such as a DDR4 memory system, a DDR5 memory system, and/or a similar memory system (sometimes collectively referred to herein as a DDRx memory system). In some examples, a CXL memory may be based on a lower power DDR (LPDDR) memory component, such as an LPDDR4 memory system, an LPDDR4x memory system, an LPDDR5 memory system, or a similar memory system (sometimes collectively referred to herein as an LPDDRx memory system). For example, a CXL memory may be based on an LPDDRx memory component in order to reduce power consumption as compared to a memory system based on a DDRx memory component and/or a similar memory component.

In some examples, stacking multiple memory components in a memory system, such as in an LPDDRx memory system, may represent a challenge. For example, stacking multiple memory components (e.g., multiple dynamic random access memory (DRAM) dies) organized in channels and ranks represents a challenge in LPDDRx memory systems or similar systems, because certain interfaces between a memory controller and the memory components (e.g., the DRAM dies) may be relatively slow and/or may not support multiple ranks of memory. For example, certain LPDDRx memory systems may be associated with bidirectional interfaces used to read and write to the multiple ranks of memory components associated with the memory system. Such bidirectional interfaces may result in low bandwidth and/or high latency associated with the memory system, because the interface may only be used for a purpose of reading memory or writing memory at any given time and/or because the interface may be associated with high latency when switching from one data-transfer direction (e.g., a read operation) to another data-transfer operation (e.g., a write operation).

Moreover, certain unidirectional interfaces may result in higher performance levels (e.g., higher bandwidth and/or reduced latency), but may not be a viable option for stacking memory components in multiple ranks, such as within an LPDDRx memory system. For example, Universal Chiplet Interconnect Express (UCIe) is a high-performance, single-ended, unidirectional, point-to-point interconnection, but UCIe may not be a viable interface solution for stacked dies (e.g., memory systems employing several ranks of memory components, such as LPDDRx memory systems) because of the point-to-point nature of the interconnect. In this way, memory systems may exhibit a tradeoff between performance and capacity, because memory systems employing bidirectional interfaces may inherently be associated with reduced performance due to the interface only being available for a purpose of reading memory or writing memory at any given time and/or due to the interface being associated with high latency when switching from one data-transfer direction to another data-transfer direction, and because memory devices employing unidirectional interfaces (e.g., UCIe interfaces) may inherently be associated with low capacity due to an inability to support stacked memory components.

Some implementations described herein enable high-performance and high-capacity memory systems, such as CXL memory systems that support memory component stacking and unidirectional interfaces. For example, some implementations described herein enable a full duplex memory system that supports stacking of memory components in multiple ranks (e.g., multiple ranks of DRAM components in implementations associated with CXL memory systems, among other examples). Put another way, some implementations described herein enable a memory system with a stackable, low-power physical layer (PHY) having separate read and write paths, resulting in a high-performance memory system that includes stacking capabilities. In some implementations, a full duplex memory device (e.g., a full duplex CXL compliant memory device) may include a controller in communication with a media subsystem via multiple channels, with each channel, of the multiple channels, being associated with multiple memory components (e.g., DRAM components) arranged in multiple ranks. In such implementations, the controller may be configured to read data from each memory component using a corresponding read-only interface and/or write data to the memory component using a corresponding write-only interface.

As a result, the full duplex memory device may have increased bandwidth, reduced latency, and/or increased capacity as compared to traditional memory systems, such as CXL memory devices that include non-full duplex (e.g., bidirectional interfaces) and/or CXL memory devices that do not support memory component stacking. For example, the full duplex memory device may support multiple ranks of memory components (e.g., multiple ranks of DRAM components), thereby increasing the capacity of the full duplex memory device as compared to certain other memory devices. Additionally, or alternatively, by utilizing unidirectional interfaces (e.g., separate read and write paths to and from the memory components), the full duplex memory device may be associated with increased bandwidth and/or reduced latency as compared to certain other memory devices because the memory device may enable concurrent reading and writing to a memory component (e.g., reading one bank of a memory component through the read-only interface while concurrently writing to another bank of the memory component through the write-only interface) and/or eliminating certain bus turnaround time constraints associated with a given memory component (e.g., enabling back-to-back read and write commands, thereby reducing read-to-write time (sometimes referred to as tRTW) and/or write-to-read time (sometimes referred to as tWTR) for the memory device). Moreover, because CXL is built on top of a full duplex link (e.g., a Peripheral Component Interconnect Express (PCIe) link), full duplex memory components may enable increased overall performance of a CXL memory system.

FIG. 1 is a diagram illustrating an example system 100 that may be implemented as a full duplex memory system. The system 100 may include one or more devices, apparatuses, and/or components for performing operations described herein. For example, the system 100 may include a host system 105 and a memory system 110. The memory system 110 may include a memory system controller 115 and one or more memory devices 120, shown as memory devices 120-1 through 120-N (where N≥1). A memory device may include a local controller 125 and one or more memory arrays 130. The host system 105 may communicate with the memory system 110 (e.g., the memory system controller 115 of the memory system 110) via a host interface 140. The memory system controller 115 and the memory devices 120 may communicate via respective memory interfaces 145, shown as memory interfaces 145-1 through 145-N (where N≥1).

The system 100 may be any electronic device configured to store data in memory. For example, the system 100 may be a computer, a mobile phone, a wired or wireless communication device, a network device, a server, a device in a data center, a device in a cloud computing environment, a vehicle (e.g., an automobile or an airplane), and/or an Internet of Things (IoT) device. The host system 105 may include a host processor 150. The host processor 150 may include one or more processors configured to execute instructions and store data in the memory system 110. For example, the host processor 150 may include a central processing unit (CPU), a graphics processing unit (GPU), a field-programmable gate array (FPGA), an application-specific integrated circuit (ASIC), and/or another type of processing component.

The memory system 110 may be any electronic device or apparatus configured to store data in memory. For example, the memory system 110 may be a hard drive, a solid-state drive (SSD), a flash memory system (e.g., a NAND flash memory system or a NOR flash memory system), a universal serial bus (USB) drive, a memory card (e.g., a secure digital (SD) card), a secondary storage device, a non-volatile memory express (NVMe) device, an embedded multimedia card (eMMC) device, a dual in-line memory module (DIMM), a CXL device, and/or a random-access memory (RAM) device, such as a DRAM device or a static RAM (SRAM) device.

The memory system controller 115 may be any device configured to control operations of the memory system 110 and/or operations of the memory devices 120. For example, the memory system controller 115 may include control logic, a memory controller, a system controller, an ASIC, an FPGA, a processor, a microcontroller, and/or one or more processing components. In some implementations, the memory system controller 115 may communicate with the host system 105 and may instruct one or more memory devices 120 regarding memory operations to be performed by those one or more memory devices 120 based on one or more instructions from the host system 105. For example, the memory system controller 115 may provide instructions to a local controller 125 regarding memory operations to be performed by the local controller 125 in connection with a corresponding memory device 120.

A memory device 120 may include a local controller 125 and one or more memory arrays 130. In some implementations, a memory device 120 includes a single memory array 130. In some implementations, each memory device 120 of the memory system 110 may be implemented in a separate semiconductor package or on a separate die that includes a respective local controller 125 and a respective memory array 130 of that memory device 120. The memory system 110 may include multiple memory devices 120.

A local controller 125 may be any device configured to control memory operations of a memory device 120 within which the local controller 125 is included (e.g., and not to control memory operations of other memory devices 120). For example, the local controller 125 may include control logic, a memory controller, a system controller, an ASIC, an FPGA, a processor, a microcontroller, a CXL controller connected to DRAM, and/or one or more processing components. In some implementations, the local controller 125 may communicate with the memory system controller 115 and may control operations performed on a memory array 130 coupled with the local controller 125 based on one or more instructions from the memory system controller 115. As an example, the memory system controller 115 may be an SSD controller, and the local controller 125 may be a NAND controller.

A memory array 130 may include an array of memory cells configured to store data. For example, a memory array 130 may include a non-volatile memory array (e.g., a NAND memory array or a NOR memory array) or a volatile memory array (e.g., an SRAM array or a DRAM array). In some implementations, the memory system 110 may include one or more volatile memory arrays 135. A volatile memory array 135 may include an SRAM array and/or a DRAM array, among other examples. The one or more volatile memory arrays 135 may be included in the memory system controller 115, in one or more memory devices 120, and/or in both the memory system controller 115 and one or more memory devices 120. In some implementations, the memory system 110 may include both non-volatile memory capable of maintaining stored data after the memory system 110 is powered off and volatile memory (e.g., a volatile memory array 135) that requires power to maintain stored data and that loses stored data after the memory system 110 is powered off. For example, a volatile memory array 135 may cache data read from or to be written to non-volatile memory, and/or may cache instructions to be executed by a controller of the memory system 110.

The host interface 140 enables communication between the host system 105 (e.g., the host processor 150) and the memory system 110 (e.g., the memory system controller 115). The host interface 140 may include, for example, a Small Computer System Interface (SCSI), a Serial-Attached SCSI (SAS), a Serial Advanced Technology Attachment (SATA) interface, a PCIe interface, an NVMe interface, a USB interface, a Universal Flash Storage (UFS) interface, an eMMC interface, a DDR interface, a DIMM interface, and/or a PCIe/CXL interface.

The memory interface 145 enables communication between the memory system 110 and the memory device 120. The memory interface 145 may include a non-volatile memory interface (e.g., for communicating with non-volatile memory), such as a NAND interface or a NOR interface. Additionally, or alternatively, the memory interface 145 may include a volatile memory interface (e.g., for communicating with volatile memory), such as a DDR interface.

In some examples, the memory system 110 may be a CXL compliant memory system (sometimes referred to herein simply as a CXL memory system, a CXL system, a CXL memory device, and/or a CXL device). CXL is a high-speed CPU-to-device and CPU-to-memory interconnect designed to accelerate next-generation performance. CXL technology maintains memory coherency between the CPU memory space and memory on attached devices, which allows resource sharing for higher performance, reduced software stack complexity, and lower overall system cost. CXL is designed to be an industry open standard interface for high-speed communications. CXL technology is built on the PCIe infrastructure, leveraging PCIe physical and electrical interfaces to provide an advanced protocol in areas such as input/output (I/O) protocol, memory protocol, and coherency interface.

In some examples, the memory system 110 may include a PCIe/CXL interface (e.g., the host interface 140 may be associated with a PCIe/CXL interface), which may be a physical interface configured to connect the CXL memory system and/or the CXL memory device to CXL compliant host devices. In such examples, the PCIe/CXL interface may comply with CXL standard specifications for physical connectivity, ensuring broad compatibility and ease of integration into existing systems using the CXL protocol. Additionally, or alternatively, a CXL memory system and/or a CXL memory device may be designed to efficiently interface with computing systems (e.g., the host system 105) by leveraging the CXL protocol. For example, a CXL memory system and/or a CXL memory device may be configured to utilize high-speed, low-latency interconnect capabilities of CXL, such as for a purpose of making the CXL memory system and/or the CXL memory device suitable for high-performance computing, data center applications, artificial intelligence (AI) applications, and/or similar applications.

A CXL memory system and/or a CXL memory device may include a CXL memory controller (e.g., memory system controller 115 and/or local controller 125), which may be configured to manage data flow between memory arrays (e.g., volatile memory arrays 135 and/or memory arrays 130) and a CXL interface (e.g., a PCIe/CXL interface, such as host interface 140). In some examples, the CXL memory controller may be configured to handle one or more CXL protocol layers, such as an I/O layer (e.g., a layer associated with a CXL.io protocol, which may be used for purposes such as device discovery, configuration, initialization, I/O virtualization, direct memory access (DMA) using non-coherent load-store semantics, and/or similar purposes); a cache coherency layer (e.g., a layer associated with a CXL.cache protocol, which may be used for purposes such as caching host memory using a modified, exclusive, shared, invalid (MESI) coherence protocol, or similar purposes); or a memory protocol layer (e.g., a layer associated with a CXL.memory (sometimes referred to as CXL.mem) protocol, which may enable a CXL memory device to expose host-managed device memory (HDM) to permit a host device to manage and access memory similar to a native DDR connected to the host); among other examples.

A CXL memory system and/or a CXL memory device may further include and/or be associated with one or more high-bandwidth memory modules (HBMMs) or similar memory arrays (e.g., volatile memory arrays 135 and/or memory arrays 130). For example, a CXL memory system and/or a CXL memory device may include multiple layers of DRAM (e.g., stacked and/or interconnected through advanced through-silicon via (TSV) technology) in order to maximize storage density and/or enhance data transfer speeds between memory layers. Additionally, or alternatively, a CXL memory system and/or a CXL memory device may include a power management unit, which may be configured to regulate power consumption associated with the CXL memory system and/or the CXL memory device and/or which may be configured to improve energy efficiency for the CXL memory system and/or the CXL memory device. Additionally, or alternatively, a CXL memory system and/or a CXL memory device may include additional components, such as one or more error correction code (ECC) engines, such as for a purpose of detecting and/or correcting data errors to ensure data integrity and/or improve the overall reliability of the CXL memory system and/or the CXL memory device.

Although the example memory system 110 described above includes a memory system controller 115, in some implementations, the memory system 110 does not include a memory system controller 115. For example, an external controller (e.g., included in the host system 105) and/or one or more local controllers 125 included in one or more corresponding memory devices 120 may perform the operations described herein as being performed by the memory system controller 115. Furthermore, as used herein, a "controller" may refer to the memory system controller 115, a local controller 125, or an external controller. In some implementations, a set of operations described herein as being performed by a controller may be performed by a single controller. For example, the entire set of operations may be performed by a single memory system controller 115, a single local controller 125, or a single external controller. Alternatively, a set of operations described herein as being performed by a controller may be performed by more than one controller. For example, a first subset of the operations may be performed by the memory system controller 115 and a second subset of the operations may be performed by a local controller 125. Furthermore, the term "memory apparatus" may refer to the memory system 110 or a memory device 120, depending on the context.

A controller (e.g., the memory system controller 115, a local controller 125, or an external controller) may control operations performed on memory (e.g., a memory array 130), such as by executing one or more instructions. For example, the memory system 110 and/or a memory device 120 may store one or more instructions in memory as firmware, and the controller may execute those one or more instructions. Additionally, or alternatively, the controller may receive one or more instructions from the host system 105 and/or from the memory system controller 115, and may execute those one or more instructions. In some implementations, a non-transitory computer-readable medium (e.g., volatile memory and/or non-volatile memory) may store a set of instructions (e.g., one or more instructions or code) for execution by the controller. The controller may execute the set of instructions to perform one or more operations or methods described herein. In some implementations, execution of the set of instructions, by the controller, causes the controller, the memory system 110, and/or a memory device 120 to perform one or more operations or methods described herein. In some implementations, hardwired circuitry is used instead of or in combination with the one or more instructions to perform one or more operations or methods described herein. Additionally, or alternatively, the controller may be configured to perform one or more operations or methods described herein. An instruction is sometimes called a "command."

For example, the controller (e.g., the memory system controller 115, a local controller 125, or an external controller) may transmit signals to and/or receive signals from memory (e.g., one or more memory arrays 130) based on the one or more instructions, such as to transfer data to (e.g., write or program), to transfer data from (e.g., read), to erase, and/or to refresh all or a portion of the memory (e.g., one or more memory cells, pages, sub-blocks, blocks, or planes of the memory). Additionally, or alternatively, the controller may be configured to control access to the memory and/or to provide a translation layer between the host system 105 and the memory (e.g., for mapping logical addresses to physical addresses of a memory array 130). In some implementations, the controller may translate a host interface command (e.g., a command received from the host system 105) into a memory interface command (e.g., a command for performing an operation on a memory array 130).

In some implementations, one or more systems, devices, apparatuses, components, and/or controllers of FIG. 1 may be configured to receive, from a host system, a read command instructing a memory device to read a first set of host data stored at a memory component, wherein the memory component is associated with a memory component rank, of multiple memory component ranks associated with a channel; and read, via the channel and based on receiving the read command, the first set of host data from the memory component using a read-only interface associated with the memory component, wherein the memory component is associated with the read-only interface and a separate write-only interface.

In some implementations, one or more systems, devices, apparatuses, components, and/or controllers of FIG. 1 may be configured to receive a read command instructing a memory device to read a first set of host data stored at a memory component, wherein the memory component is associated with a memory component rank, of multiple memory component ranks associated with a channel; read, based on receiving the read command, the first set of host data from the memory component using a read-only interface associated with the memory component; receive a write command instructing the memory device to write a second set of host data to the memory component; and write, based on receiving the write command, the second set of host data to the memory component using a write-only interface associated with the memory component.

In some implementations, one or more systems, devices, apparatuses, components, and/or controllers of FIG. 1 may be associated with a CXL compliant memory device, a controller, and a media subsystem in communication with the controller via multiple channels, wherein each channel, of the multiple channels, is associated with multiple DRAM components arranged in multiple DRAM component ranks, and/or the one or more systems, devices, apparatuses, components, and/or controllers of FIG. 1 may be configured to receive, from a host system, a read command instructing the CXL compliant memory device to read a first set of host data stored at a DRAM component, of the multiple DRAM components, associated with a first channel, of the multiple channels; read, via the first channel and based on receiving the read command, the first set of host data from the DRAM component using a read-only interface associated with the DRAM component; receive, from the host system, a write command instructing the CXL compliant memory device to write a second set of host data to the DRAM component; and write, via the first channel and based on receiving the write command, the second set of host data to the DRAM component using a write-only interface associated with the DRAM component.

The number and arrangement of components shown in FIG. 1 are provided as an example. In practice, there may be additional components, fewer components, different components, or differently arranged components than those shown in FIG. 1. Furthermore, two or more components shown in FIG. 1 may be implemented within a single component, or a single component shown in FIG. 1 may be implemented as multiple, distributed components. Additionally, or alternatively, a set of components (e.g., one or more components) shown in FIG. 1 may perform one or more operations described as being performed by another set of components shown in FIG. 1. FIGS. 2A-2J are diagrams of an example associated with a full duplex memory system. The operations described in connection with FIGS. 2A-2J may be performed by the memory system 110 and/or one or more components of the memory system 110, such as the memory system controller 115, one or more memory devices 120, and/or one or more local controllers 125.

Figure 2A:
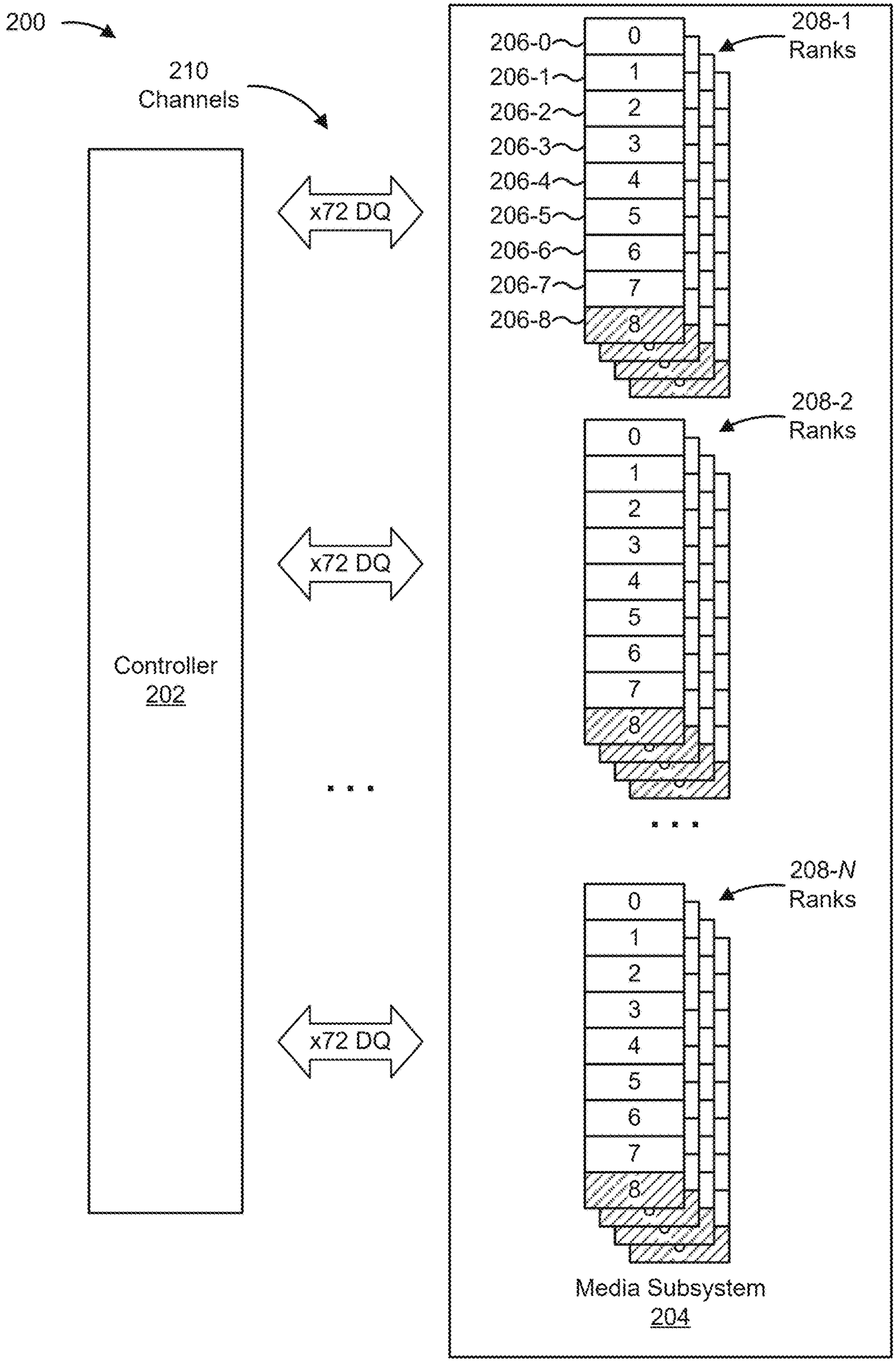
FIGS. 2A-2J are diagrams of an example associated with a full duplex memory system.

In some implementations, a full duplex memory system may be a memory system that includes multiple stacked memory components and/or memory components arranged in multiple channels and/or multiple ranks. For example, FIG. 2A shows an example memory system 200 that includes stacked memory components arranged in multiple channels and/or ranks. The memory system 200, which may correspond to the memory system 110, includes a controller 202 (e.g., the memory system controller 115 and/or the local controller 125) and a media subsystem 204 (e.g., the memory devices 120 and/or the memory arrays 130, sometimes referred to as a memory module). The media subsystem 204 may be associated with multiple memory components 206, which, in some implementations, may be multiple DRAM dies. In some implementations, the multiple memory components 206 may be organized into ranks 208 of memory components. For example, the memory system 200 may include a first set of ranks 208-1 of memory components 206 through an N-th set of ranks 208-N of memory components 206. In the example shown in FIG. 2A, the memory components 206 may be arranged in four ranks (e.g., the memory system 200 may be a rank-four memory system), such that each set of ranks 208 includes four ranks of memory components 206, with each rank of memory components including nine memory components 206 (e.g., nine DRAM dies), indexed as memory component 206-0 through memory component 206-8 in the example shown in FIG. 2A.

In some examples, each set of ranks 208 may be associated with a corresponding memory channel 210 (e.g., a data pathway between memory (e.g., DRAM) and other components of a memory device, such as the controller 202 and/or a processor), with a "width" of the memory channel (e.g., measured in bits) referring to a quantity of bits that may be transferred in one operation and/or one memory cycle. In some examples, during each memory access to a given rank of memory components 206 via a given channel 210, a user data block (UDB) (sometimes referred to as a memory stripe, a data frame, a memory frame, a device physical address (DPA), and/or a similar term) associated with the nine memory components may be accessed. The UDB may be associated with multiple dies of memory (e.g., the multiple memory components 206) used to store data bits and/or parity bits. Put another way, in some examples multiple data bits and/or parity bits may be stripped across multiple dies associated with the UDB. For example, in the implementation shown in FIG. 2A, the UDB is associated with nine memory components 206 (e.g., nine DRAM dies), indexed as a first memory component 206-0 through a ninth memory component 206-8, with the first memory component 206-0 through an eighth memory component 206-7 used to store data bits (and thus sometimes referred to as data dies) and with the ninth memory component 206-8 used to store parity bits for error correction purposes (and thus sometimes referred to as an extra die, and shown in FIG. 2A using hatching). A UDB may include data from a given bank of each memory component 206 for the accessed rank. For example, a first UDB may be associated with a first bank of each of the nine memory components 206 for a given rank, a second UDB may be associated with a second bank of each of the nine memory components 206 for a given rank, and so forth. As described in more detail below, in some examples a memory component 206 may be associated with sixteen banks. In such examples, each rank of memory components may comprise sixteen UDBs. Additionally or alternatively, the UDB may be associated with a certain burst length (e.g., a burst length of 16 or 32, among other examples), such that, during each access of the UDB, a quantity of bit lines (e.g., corresponding to the burst length) of each die may be transmitted in a channel 210.

Moreover, each memory component 206 may be configured in a "by eight" (x8) configuration, a "by four" (x4) configuration, or a similar configuration, such that each die includes multiple input/output pins (sometimes referred to as data pins and/or DQ pins), such as eight DQ pins when configured in a x8 configuration or four DQ pins when configured in a x4 configuration, among other examples. In this regard, each bank of each memory component 206 may be capable of storing a quantity of bits, such as 128 bits (b) (e.g., 16 bytes (B)) in examples in which the memory components 206 are configured in a x8 mode with a burst length of 16. In such implementations, the UDB may be associated with 128 B of data (corresponding to the banks of first memory component 206-0 through the eighth memory component 206-7, with each bank capable of storing 16 B) and/or 16 B of parity information (corresponding to bank of the ninth memory component 206-8, capable of storing 16 B).

Each set of ranks 208 may be associated with a corresponding channel 210. Returning to the above example in which the memory components 206 are configured in a x8 mode, a width of each channel 210 may be 72 b, corresponding to the eight DQ pins associated with each memory component 206, of which 64 b may be associated with data (e.g., the data stored on the first memory component 206-0 through the eighth memory component 206-7) and/or 8 b may be associated with parity information (e.g., the parity information and/or ECC information stored on the ninth memory component 206-8). Accordingly, during each access of a UDB by the controller 202 via a respective channel 210, sixteen bursts of 72 bits each (e.g., 64 bits of data and 8 bits of parity) may be transmitted via a channel 210, resulting in a single channel access of 128 B.

As shown by using double-sided arrows in FIG. 2A, each channel 210 may be bi-directional, meaning that the DQ pins may be used to read and write data to the memory components 206. For example, in instances in which each of the nine memory components 206 is associated with eight DQ pins, each channel 210 may include 72 bidirectional pins (e.g., each channel 210 may be referred to as a x72 DQ channel). In some other examples, the memory components 206 and/or channels 210 may be otherwise configured. For example, in some examples, the channels 210 may be associated with eighteen memory components 206 in a x4 configuration (resulting in x72 DQ channels) or ten memory components 206 in a x4 configuration (resulting in x40 DQ channels), among other examples. As described above, this may limit a performance of the memory system 200, because bidirectional interfaces may result in low bandwidth and/or high latency associated with the memory system 200 as the interface may only be used for a purpose of reading data from a certain memory component 206 or writing data to the certain memory component 206 at any given time.

Figure 2B:
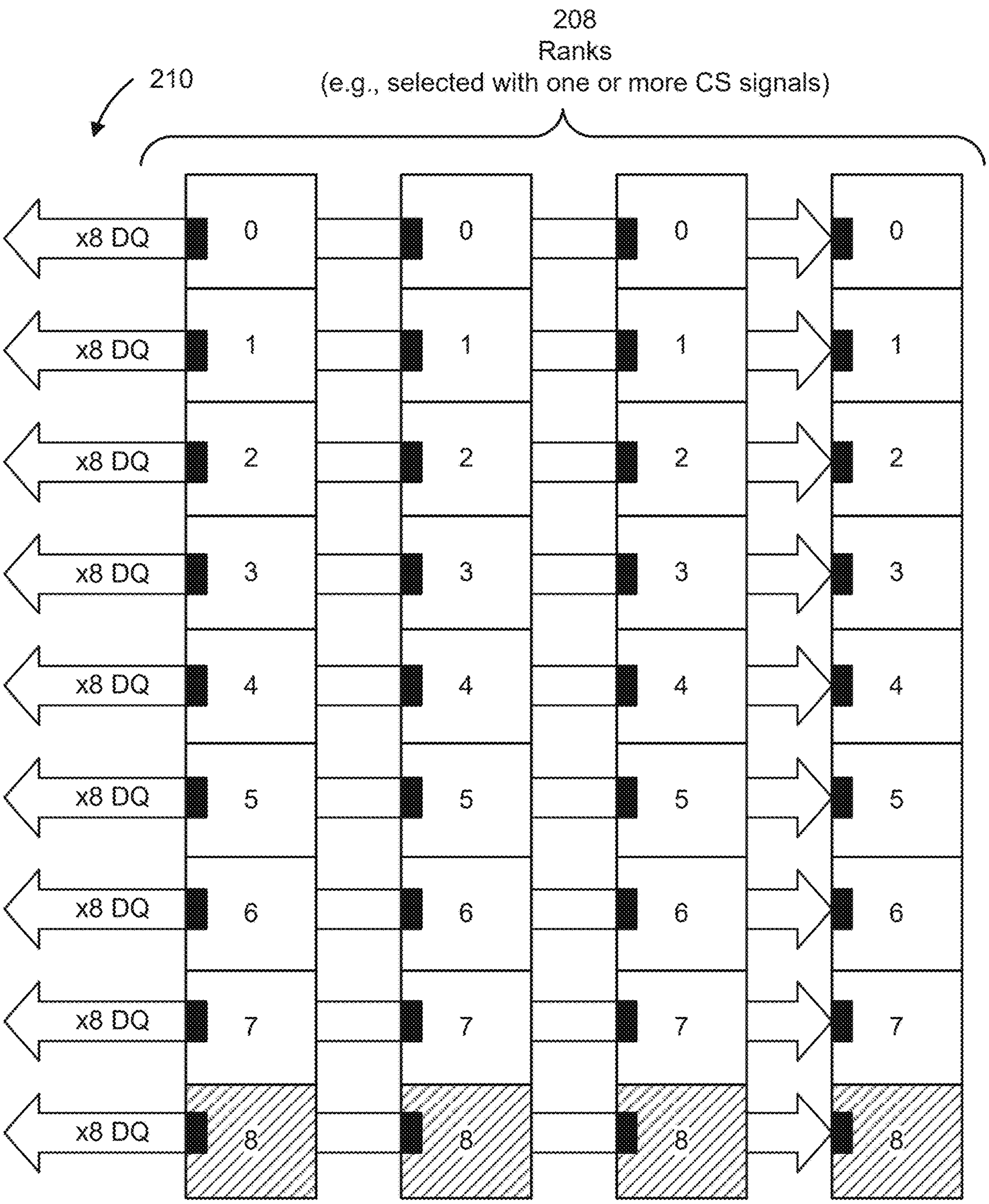

This may be more readily understood with reference to FIG. 2B, which shows one set of ranks 208 in more detail. In this example, each memory component 206 may be associated with eight bidirectional DQ pins (e.g., each memory component 206 may be configured in a x8 mode), but, in some other examples, each memory component 206 may be otherwise configured (e.g., in x4 mode, among other examples). Moreover, corresponding memory components 206 at each rank may be connected to a common DQ bus (e.g., a memory component indexed as 0 for the first rank may be connected to a same DQ bus as a memory component indexed as 0 for the second rank, and so forth), such that the controller 202 may access only one of the ranks of memory components at a time. In such examples, a controller may select which of the four ranks, of the set of ranks 208, is to be accessed (e.g., using one or more chip select signals, described in more detail below), and/or may access a certain bank of each memory component (e.g., memory component 0 through memory component 8 in the example shown in FIG. 2B) for the selected rank using the nine bidirectional x8 DQ interfaces (e.g., one for each memory component 206 in the selected rank).

Figure 2C:
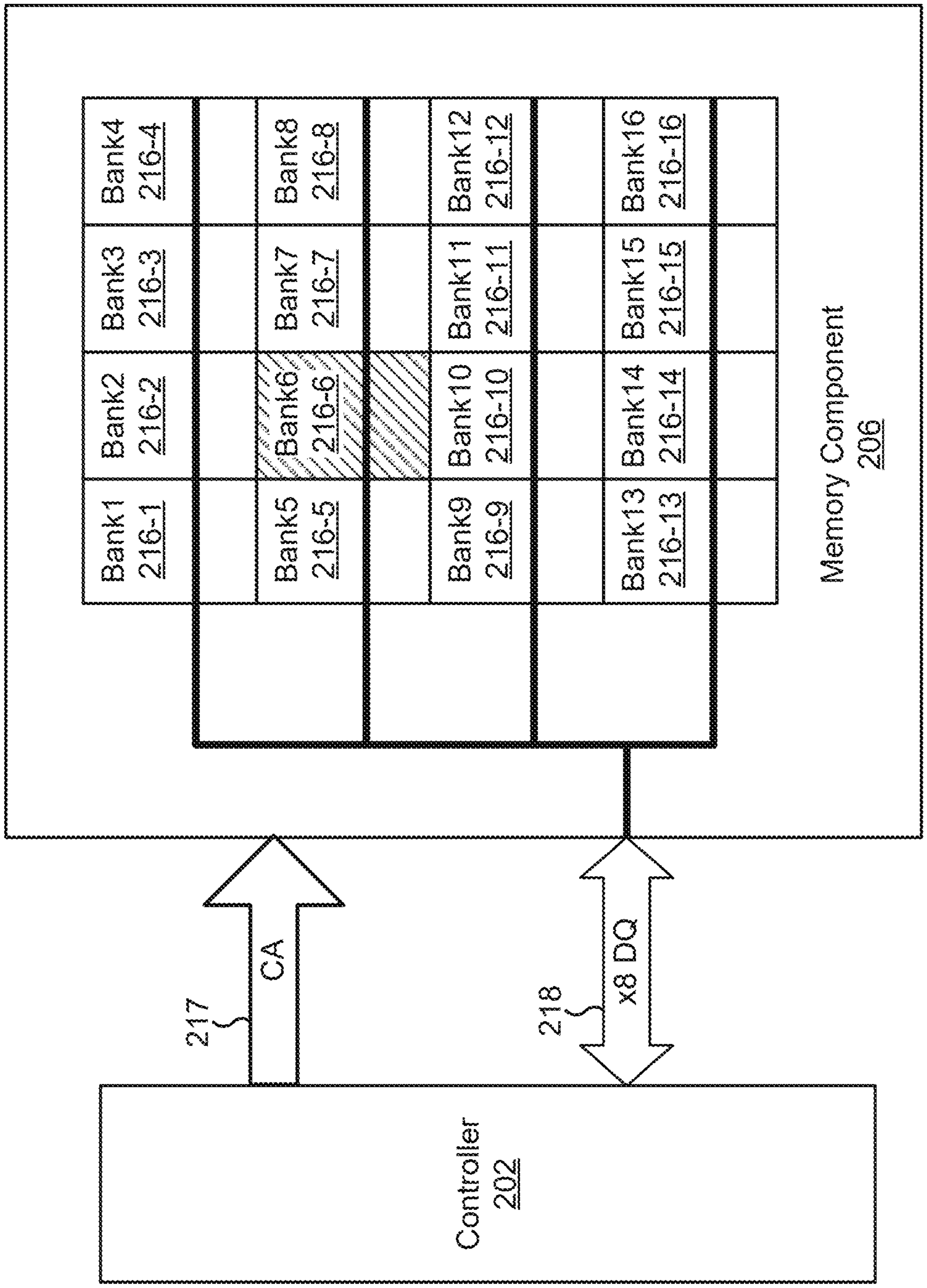

FIG. 2C shows a high-level representation of interfaces for a given memory component 206, such as one of the memory components 206 described above in connection with FIGS. 2A and/or 2B. In some examples, each memory component 206 may be organized into multiple banks 216. For example, the memory component 206 shown in FIG. 2C is organized into sixteen banks (shown as a first bank 216-1 through a sixteenth bank 216-16), but, in some other examples, the memory component 206 may be organized into more or less banks 216 without departing from the scope of the disclosure. Each bank 216 may be associated with a portion of the memory component 206 that may be accessed during one access of the memory component 206 (e.g., during one memory cycle). For example, as shown using hatching in FIG. 2C, a sixth bank 216-6 may be accessed during a given memory cycle, meaning that the sixth bank 216-6 may be read to or written from using the DQ pins (e.g., the eight DQ pins) associated with the memory component 206.

As indicated by reference number 217, the controller 202 may be in communication with the memory component 206 via a corresponding command/address (CA) interface, which may be a one-way interface in which the controller 202 may transmit command and/or address signals to the memory component 206. The command and/or address signals may be used to perform accesses to the memory component 206, such as by indicating read commands, write commands, activate commands, precharge commands, and/or refresh commands, among other examples, as well as specifying addresses (e.g., locations and/or banks 216) in the memory component 206 in which the accesses are to take place. As indicated by reference number 218, the controller 202 may also be in communication with the memory component 206 via a bidirectional read/write interface, which may be a two-way interface in which the controller 202 may read data from a given bank 216 (e.g., the sixth bank 216-6 in the depicted example, but which may be different banks 216 in other memory accesses and/or examples) and/or write data to the given bank 216. For example, in a similar manner as described above in connection with FIG. 2A, the memory component 206 may be configured in a x8 mode. Accordingly, in such examples, the controller 202 may read and/or write data using eight DQ pins associated with the memory component 206.

Figure 2D:
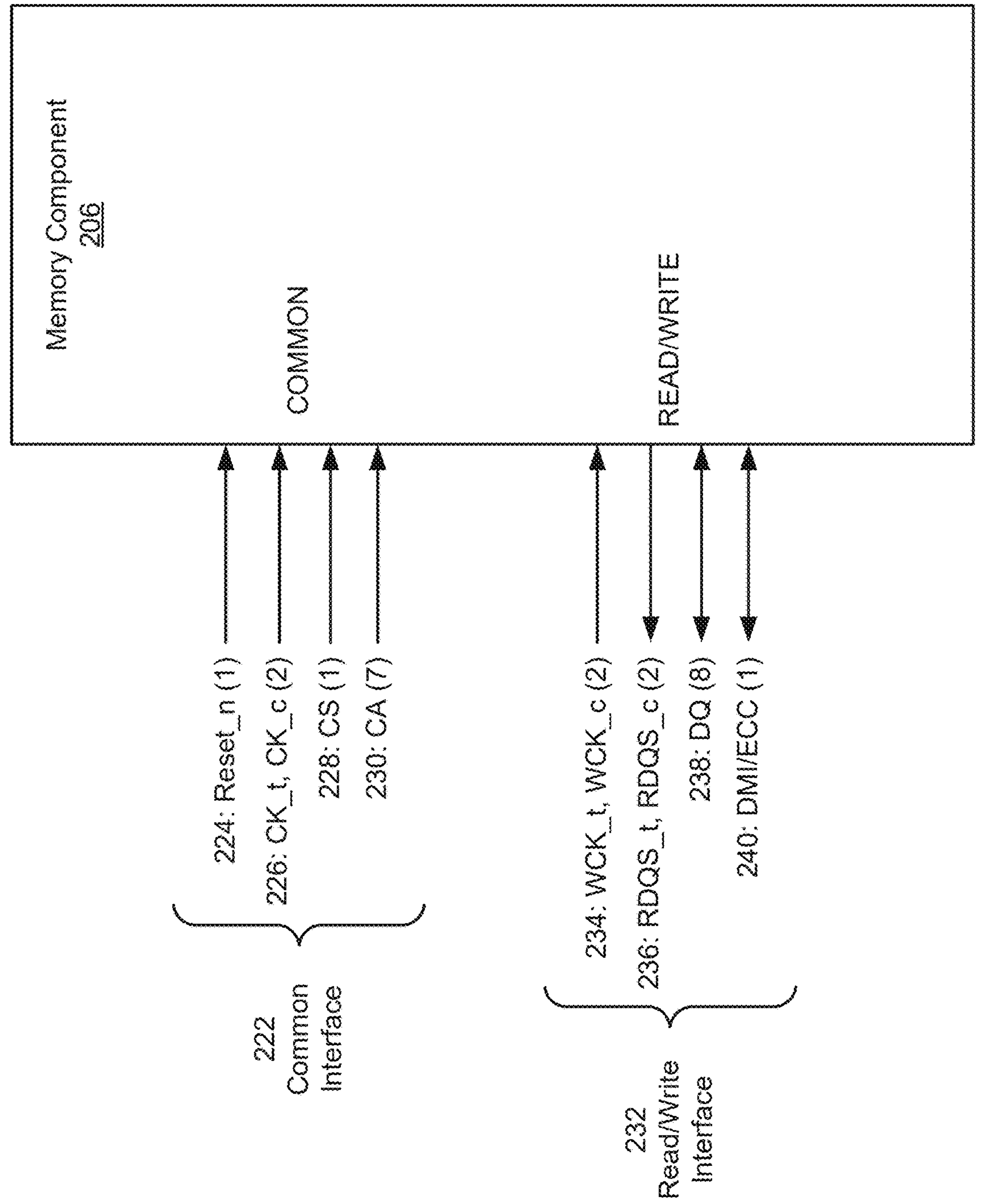

FIG. 2D shows in more detail example interfaces for a memory component 206 that is in a x8 configuration and that utilizes bidirectional data interfaces. In such implementations, a controller (e.g., controller 202, not shown in FIG. 2D for ease of description) may communicate with the memory component 206 using a common interface 222 (e.g., the CA interface described above in connection with reference number 217) and/or a read/write interface 232 (e.g., the read/write interface described above in connection with reference number 218). The common interface 222 may be associated with multiple unidirectional pins and/or signals (described herein simply as signals for ease of discussion), such as a reset signal (sometimes referred to as Reset_n) shown by reference number 224, two differential clock input signals including a clock true signal (sometimes referred to as CK_t) and a clock complementary signal (sometimes referred to as CK_c) shown by reference number 226, a chip select signal (sometimes referred to as CS) shown by reference number 228, and/or multiple (e.g., seven) command/address signals (sometimes referred to as CA) shown by reference number 230.

The reset signal (e.g., Reset_n) may be used to transmit signal resets to memory components. For example, when the reset signal is asserted low, the reset signal may reset a memory component. In this regard, the reset signal may be an asynchronous signal. The differential clock input signals (e.g., CK_t and CK_c) may be used for providing timing for data and/or command transfer. More particularly, in DDR systems, CA inputs may be sampled on both crossing points of CK_t and CK_c, with the first crossing point corresponding to the rising edge of CK_t and the falling edge of CK_c, and the second crossing point corresponding to the falling edge of CK_t and the rising edge of CK_c. In single date rate (SDR) systems, CA inputs may be sampled on a single crossing point of CK_t and CK_c, which may be the rising edge of CK_t and the falling edge of CK_c. The chip select signal (e.g., CS) may be a signal used to select a memory chip and/or a memory bank within a memory module (e.g., when multiple memory devices are present, CS may be used to address a specific device for communication). In some examples, CS may be part of the command code and/or may be sampled on the crossing point of the rising edge of CK_t and the falling edge of CK_c, unless the device is in a power-down mode and/or a deep-sleep mode in which CS may become an asynchronous signal. The multiple command/address signals (e.g., CA) may be used to provide command inputs (e.g., read, write, activate, and/or precharge, among other information) and address inputs (e.g., a location within the memory where the operation is to be performed), such as by providing command and address inputs according to a command truth table.

The read/write interface 232 may be associated with multiple unidirectional or bidirectional pins and/or signals (described herein simply as signals for ease of discussion), such as two differential clock input signals including a write clock true signal (sometimes referred to as WCK_t) and a write clock complementary signal (sometimes referred to as WCK_c) shown by reference number 234, two read data strobe signals including a read data strobe true signal (sometimes referred to as RDQS_t) and a read data strobe complementary signal (sometimes referred to as RDQS_c) shown by reference number 236, multiple (e.g., eight in examples including a x8 configuration) data signals (sometimes referred to as DQ) shown by reference number 238, and a data mask inversion (DMI)/ECC signal shown by reference number 240.

The write differential clock input signals (e.g., WCK_t and WCK_c) may be differential clocks used for write data capture and read data output. In some examples, the write differential clock input signals (e.g., WCK_t and WCK_c) may provide timing reference for writing data to and/or reading data from the memory component 206. The read data strobe signals (e.g., RDQS_t and RDQS_c) may be differential output clock signals used to strobe data during a read operation. In some examples, the read data strobe true signal (e.g., RDQS_t) may be used as a parity pin at write with link protection enabled. The data signals (e.g., DQ) may be associated with a bidirectional data bus, and thus may be signals used to transfer data to and from the memory component 206. More particularly, during read operations, data flows from the memory component 206 to the controller via the DQ lines, and during write operations, data flows from the controller to the memory component 206 via the DQ lines. The DMI/ECC signal may be used for multiple purposes, such as data mask (DM), data bus inversion (DBI), and/or parity at read with ECC operations by setting a mode register. In some examples, DMI/ECC may be a bidirectional signal and/or each byte of data may be associated with a corresponding DMI signal. Due to the bidirectional configuration of the read/write interface 232 (and more particularly the DQ pins shown by reference number 238), the memory system in this implementation may be associated with reduced performance, such as low bandwidth and/or high latency.

Figure 2E:
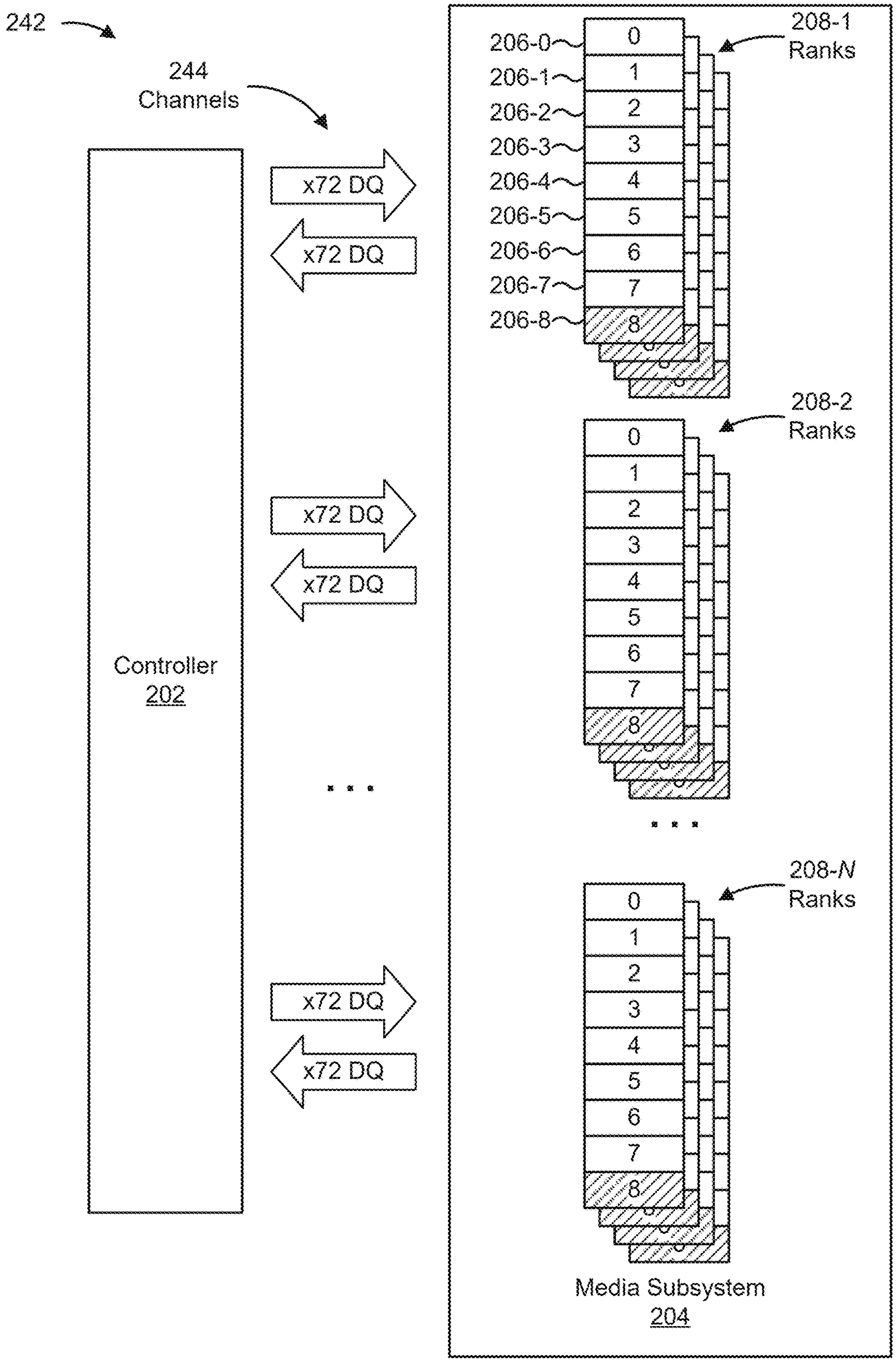

Accordingly, in some implementations a memory system may include two data paths to each memory component 206, including a read-only data path and a write-only data path, such as for a purpose of enabling back-to-back read and write commands to a given bank 216 and/or simultaneous read and write operations (e.g., reading one bank 216 concurrently with writing to another bank 216), among other benefits. For example, FIG. 2E shows an example memory system 242 that is similar to the example memory system 200 described above in connection with FIG. 2A, but which includes unidirectional interfaces (e.g., read-only interfaces and write-only interfaces) to communicate with the memory components 206. In that regard, the memory system 242, which may correspond to the memory system 110, includes the controller 202 (e.g., the memory system controller 115 and/or the local controller 125) and the media subsystem 204 (e.g., the memory devices 120 and/or the memory arrays 130, sometimes referred to as a memory module) described above.

In this implementation, however, each set of ranks 208 may be associated with a corresponding memory channel 244 that includes read-only interfaces (e.g., 72 DQ pins used to read data from the memory components 206 for the corresponding channel 244) and write-only interfaces (e.g., 72 DQ pins used to write data from the memory components 206 for the corresponding channel 244). Put another way, as shown by using single-sided arrows in FIG. 2E, each channel 244 may include two unidirectional interfaces, meaning that a first set of DQ pins (e.g., a first set of 72 DQ pins in implementations employing nine memory components 206 per rank configured in a x8 mode) may be used to read data from the memory components 206 and that a second set of DQ pins (e.g., a second set of 72 DQ pins in implementations employing nine memory components 206 per rank configured in a x8 mode) may be used to write data to the memory components 206. For example, in instances in which each of the nine memory components is associated with eight DQ pins, each channel 244 may include 144 unidirectional pins (e.g., 72 pins used to transmit data from the controller 202 to the media subsystem 204 and another 72 pins used to transmit data from the media subsystem 204 to the controller 202). In some other examples, the memory components 206 and/or channels 244 may be otherwise configured. For example, in some examples, the channels 244 may be associated with eighteen memory components 206 in a x4 configuration (resulting in x144 DQ channels, with 72 DQ pins used for read operations and 72 DQ pins used for write operations) or ten memory components 206 in a x4 configuration (resulting in x80 DQ channels, with 40 DQ pins used for read operations and 40 DQ pins used for write operations), among other examples. As described above, this may improve a performance of the memory system 242, because unidirectional interfaces may result in high bandwidth and/or low latency associated with the memory system 242 as the interfaces may be used for simultaneous reading and writing operations and/or elimination of data bus turnaround times, among other examples.

Figure 2F:
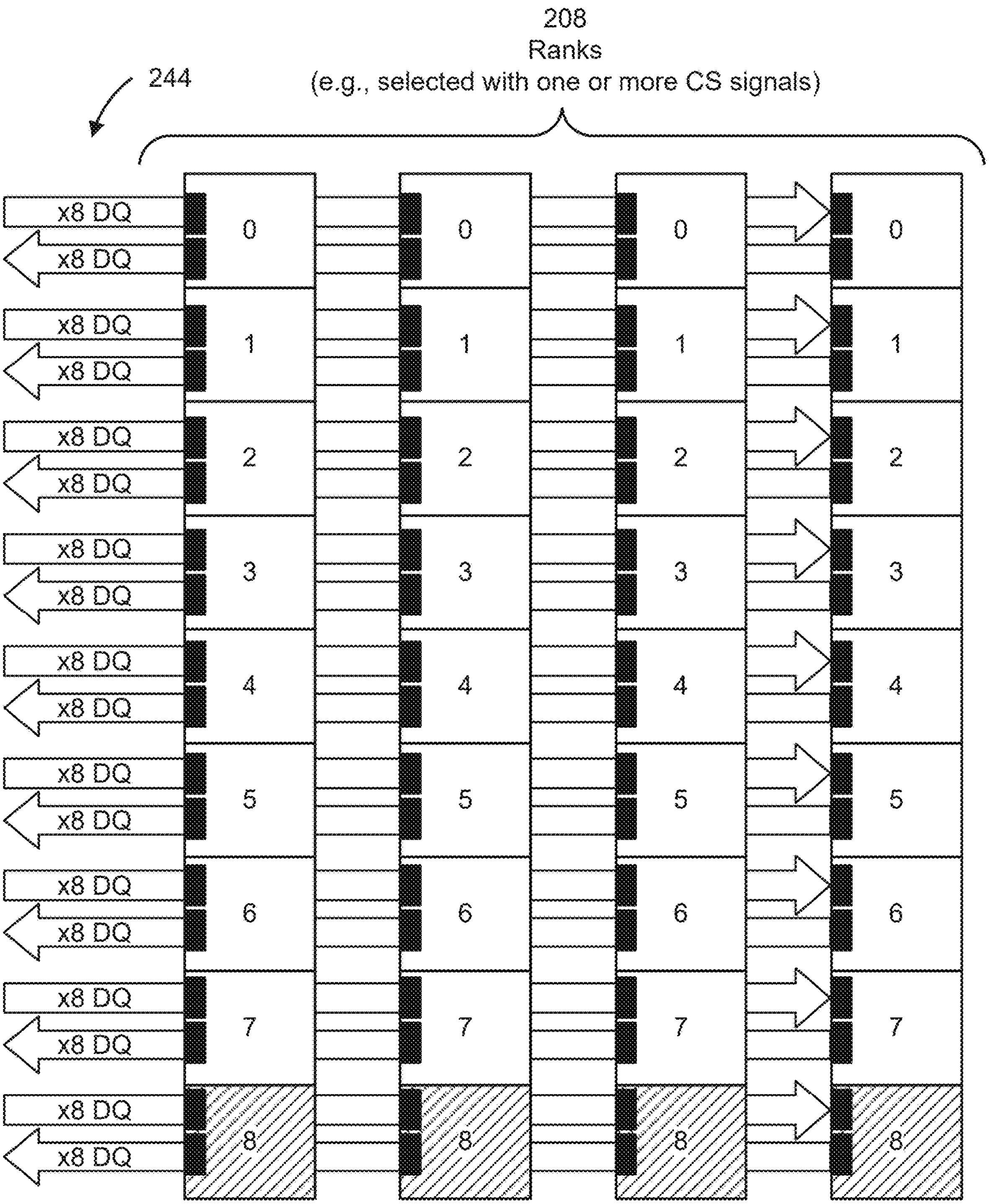

This may be more readily understood with reference to FIG. 2F, which shows one set of ranks 208 in more detail. In this example, each memory component 206 may be associated with sixteen unidirectional DQ pins (e.g., each memory component may be configured in a x8 mode, with eight read-only pins and eight write-only pins), but, in some other examples, each memory component 206 may be otherwise configured (e.g., in x4 mode, among other examples). In this implementation, corresponding memory components 206 at each rank may be connected to a common read-only DQ bus (e.g., a memory component indexed as 0 for the first rank may be connected to a same read-only DQ bus as a memory component indexed as 0 for the second rank, and so forth) and a common write-only DQ bus (e.g., a memory component indexed as 0 for the first rank may be connected to a same write-only DQ bus as a memory component indexed as 0 for the second rank, and so forth), such that the controller 202 may read one bank 216 of a given rank while writing to another bank 216 of the given rank, and/or such that the controller 202 may read one rank while writing to another rank.

Figure 2G:
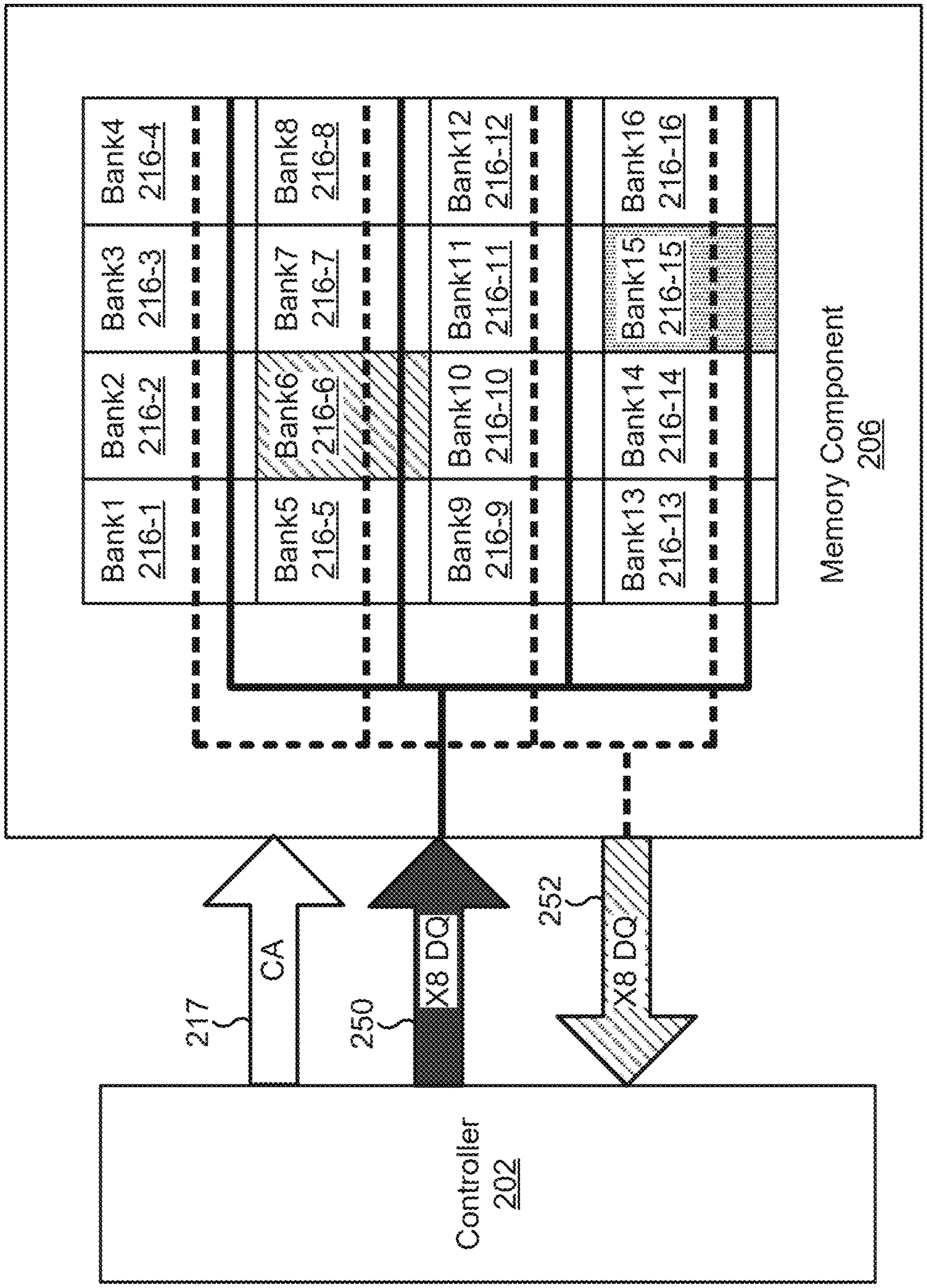

FIG. 2G shows a high-level representation of interfaces for a given memory component 206 that is associated with unidirectional interfaces. As described above in connection with FIG. 2C, the memory component 206 may be organized into multiple banks 216. In this implementation, however, each bank 216 has a separate read path and write path. Accordingly, the controller 202 may communicate with one bank 216 using the read path while simultaneously communicating with another bank 216 using the write path. For example, as shown using hatching in FIG. 2G, a sixth bank 216-6 may be accessed during a given memory cycle using one of the read path or the write path, and, as shown using stippling in FIG. 2G, a fifteenth bank 216-15 may be accessed during a given memory cycle using the other one of the read path or the write path.

More particularly, as indicated by reference number 217, the controller 202 may be in communication with the memory component 206 via a CA interface, which may be substantially similar to the CA interface described above in connection with FIG. 2C. As indicated by reference number 250, the controller 202 may also be in communication with the memory component 206 via a unidirectional write-only interface, which may be a one-way interface in which the controller 202 may write data to a given bank 216 using the write-only DQ pins. For example, when the memory component 206 is configured in a x8 mode, the controller 202 may write data using eight write-only DQ pins associated with the memory component 206. Similarly, as indicated by reference number 252, the controller 202 may also be in communication with the memory component 206 via a unidirectional read-only interface, which may be a one-way interface in which the controller 202 may read data from a given bank 216 using the read-only DQ pins. For example, when the memory component 206 is configured in a x8 mode, the controller 202 may read data using eight read-only DQ pins associated with the memory component 206.

Figure 2H:
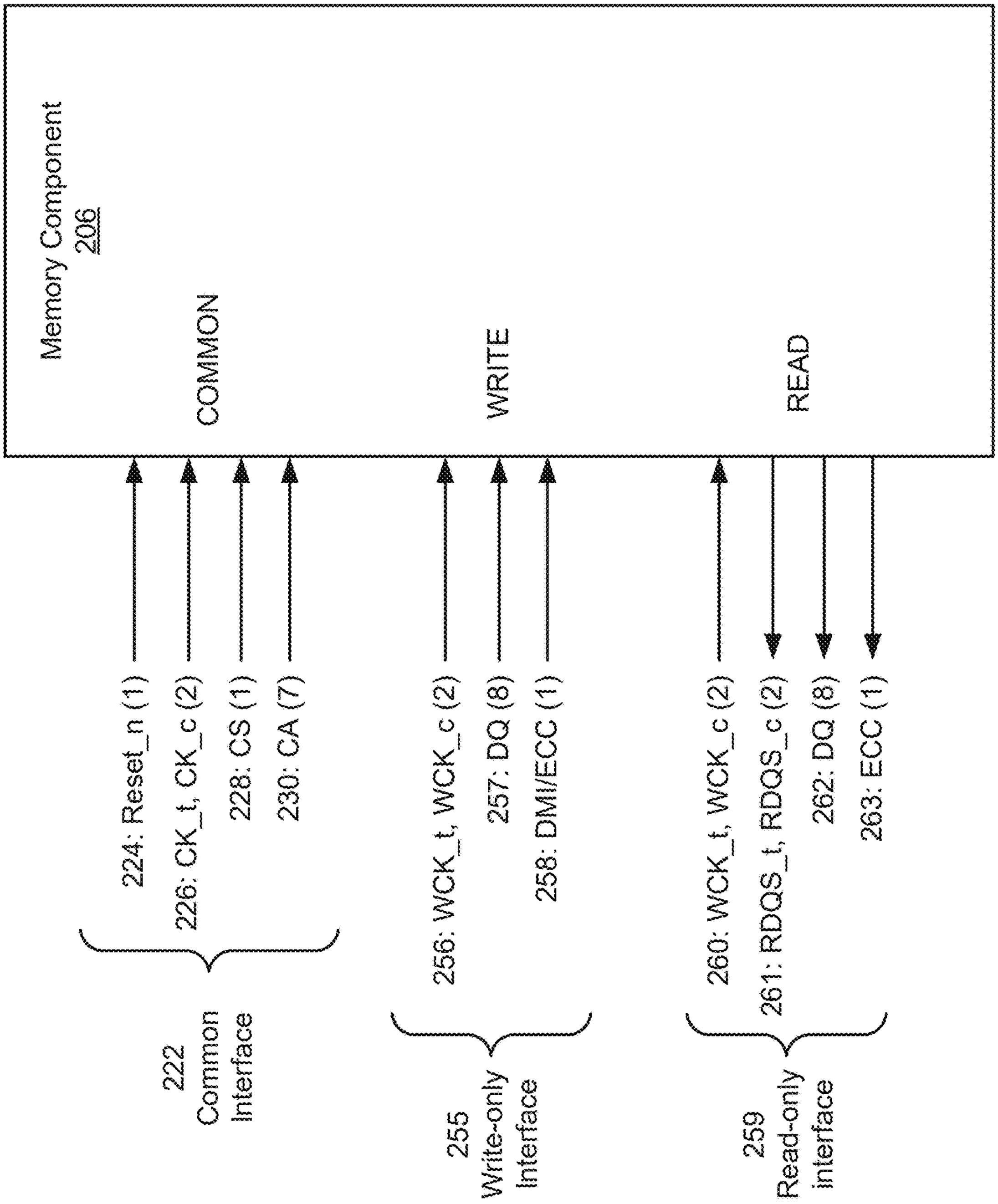

FIG. 2H shows in more detail example interfaces for a memory component 206 that is in a x8 configuration and that implements unidirectional data interfaces (e.g., that implements a write-only interface and a read-only interface). In such implementations, a controller (e.g., controller 202, not shown in FIG. 2H for ease of description) may communicate with the memory component 206 using the common interface 222 (e.g., the CA interface described above in connection with reference number 217), a write-only interface 255 (e.g., the write-only interface described above in connection with reference number 250), and a read-only interface 259 (e.g., the read-only interface described above in connection with reference number 252). The common interface 222 may function in a substantially similar manner as described above in connection with the memory system of FIG. 2D and/or may include substantially similar signals as described above in connection with the memory system of FIG. 2D, and thus the common interface 222 is not described again in detail for ease of description.

The write-only interface 255 may be associated with multiple unidirectional pins and/or signals (described herein simply as signals for ease of discussion) used for write operations, such as two differential clock input signals including a write clock true signal (e.g., WCK_t) and a write clock complementary signal (e.g., WCK_c) shown by reference number 256, multiple (e.g., eight in examples including a x8 configuration) data signals (e.g., DQ) shown by reference number 257, and a DMI/ECC signal, shown by reference number 258. The write differential clock input signals (e.g., WCK_t and WCK_c) may be differential clocks used for write data capture, and thus may provide timing reference for writing data to the memory component 206. In this example, the data signals (e.g., DQ) may be associated with a unidirectional data bus, and thus may be signals used to transfer data to the memory component 206. More particularly, during write operations, data flows from the controller to the memory component 206 via the DQ signals indicated by reference number 257. The DMI/ECC signal may be used for multiple purposes, such as DM, DBI, and/or parity at read with ECC operations. The DMI/ECC signal may be unidirectional in this example (e.g., the DMI/ECC signal associated with the write-only interface 255 may be used to transmit information from the controller to the memory component 206).

The read-only interface 259 may be associated with multiple unidirectional pins and/or signals used for read operations, such as two differential clock input signals including a write clock true signal (e.g., WCK_t) and a write clock complementary signal (e.g., WCK_c) shown by reference number 260, two read data strobe signals including a read data strobe true signal (e.g., RDQS_t) and a read data strobe complementary signal (e.g., RDQS_c) shown by reference number 261, multiple (e.g., eight in examples including a x8 configuration) data signals (e.g., DQ) shown by reference number 262, and an ECC signal, shown by reference number 263. The write differential clock input signals (e.g., WCK_t and WCK_c) may be differential clocks used for read data output, and thus may provide timing reference for reading data from the memory component 206. The read data strobe signals (e.g., RDQS_t and RDQS_c) may be differential output clock signals used to strobe data during a read operation. In some examples, the read data strobe true signal (e.g., RDQS_t) may be used a parity pin at write with link protection enabled. In this example, the data signals (e.g., DQ) may be associated with a unidirectional data bus, and thus may be signals used to transfer data from the memory component 206. More particularly, during read operations, data flows from the memory component 206 to the controller via the DQ signals indicated by reference number 262. The ECC signal may be used for parity at read with ECC operations. The ECC signal may be unidirectional in this example (e.g., the ECC signal associated with the read-only interface 259 may only be used to transmit information (e.g., ECC information) from the memory component 206 to the controller).

As described above, by utilizing unidirectional interfaces (e.g., the write-only interface 255 and the read-only interface 259), a memory system may enable high performance memory devices by reducing latency and/or increasing bandwidth associated with memory devices. For example, with respect to accessing data from multiple memory locations (e.g., multiple banks 216), the memory system may be capable of concurrent read and write operations, because the memory system may write data to a first memory location (e.g., a first bank 216) using the write-only interface 255 while concurrently reading data from a second memory location (e.g., a second bank 216) using the read-only interface 259. Put another way, in some implementations, the write-only interface 255 and the read-only interface 259 may enable a memory system to receive, from a host system (e.g., host system 105), a read command instructing the controller to read a first set of host data stored at a first bank of a memory component (e.g., a first bank 216 of the memory component 206); read, via a channel (e.g., channel 210) and based on receiving the read command, the first set of host data from the first bank of the memory component using the read-only interface 259; receive, from the host system, a write command instructing the memory device to write a second set of host data to a second bank of the memory component (e.g., a second bank 216 of the memory component 206); and write, via the channel and based on receiving the write command, the second set of host data to the second bank of the memory component using the write-only interface 255, such that writing the second set of host data to the second bank of the memory component at least partially overlaps in time with reading the first set of host data from the first bank of the memory component.

Additionally, or alternatively, with respect to accessing data from a single memory location (e.g., a single bank 216 of the memory component 206), a memory system implementing the architecture shown in FIG. 2H may be capable of back-to-back read and write operations, because the memory system may write or read data to the memory location (e.g., a specific bank 216) using the write-only interface 255 or the read-only interface 259 and then read or write data from the memory location (e.g., the specific bank 216) using the read-only interface 259 or the write-only interface 255 without accounting for bus turnaround latency, or the like. This may be more readily understood with reference to FIGS. 21 and 2J.

Figure 2I:
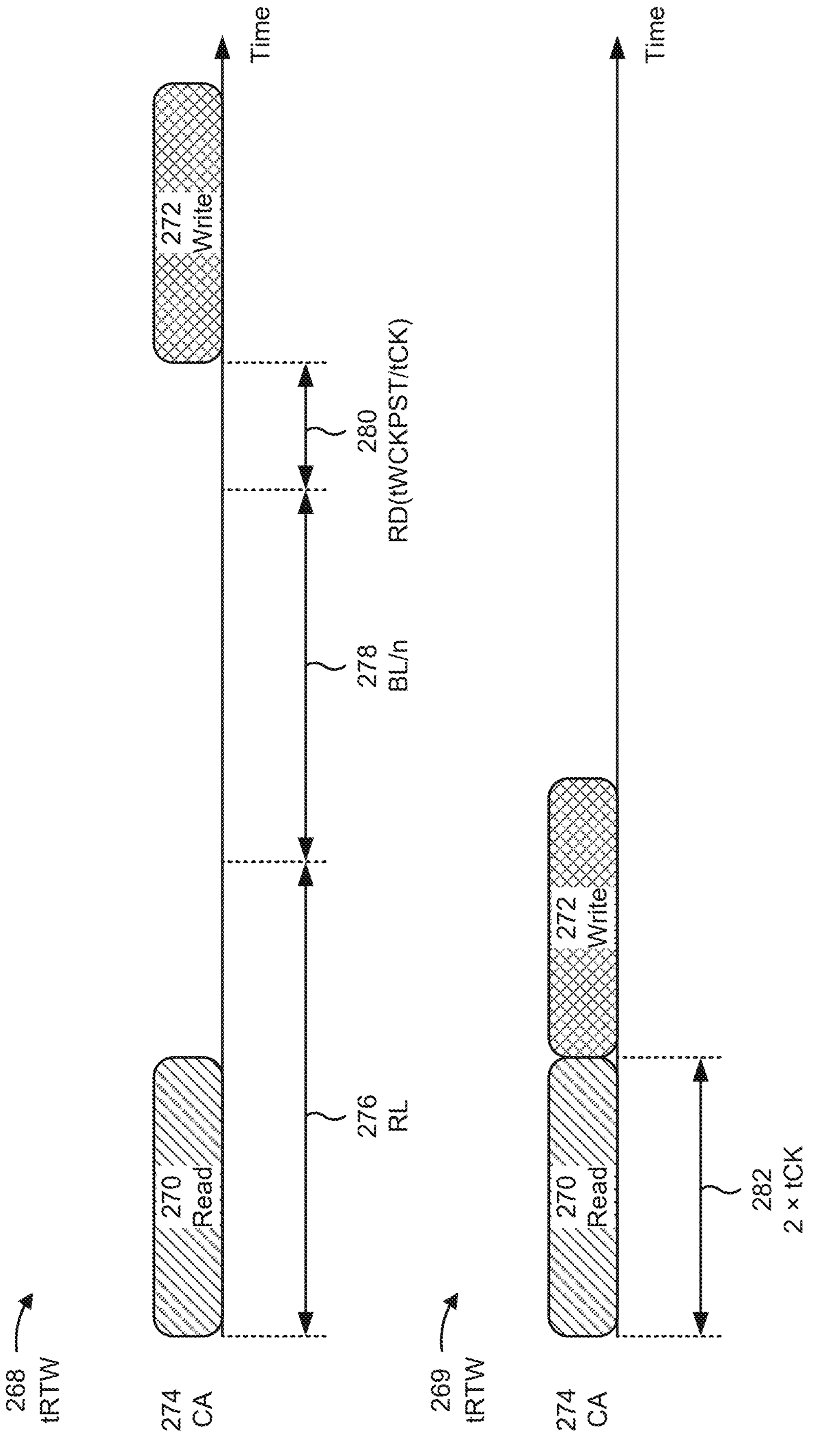

First, FIG. 2I shows an example 268 associated with a read-to-write time (tRTW) associated with a memory system utilizing a bidirectional read/write interface (e.g., the read/write interface 232 described above in connection with FIG. 2D) and an example 269 associated with a tRTW associated with a memory device utilizing a write-only interface (e.g., the write-only interface 255 described above in connection with FIG. 2H) and a read-only interface (e.g., the read-only interface 259 described above in connection with FIG. 2H).

As shown by example 268, a tRTW associated with a bidirectional read/write interface may be associated with high latency, due to certain bus turnaround constraints and/or parameters that may need to be accounted for at the memory system. More particularly, example 268 shows a time at which a read command 270 and a write command 272 arrive at a CA interface 274 (e.g., the common interface 222) in a memory system. As indicated by reference number 276, the read command 270 in this example may be associated with a period of time used to complete the read operation, which is sometimes referred to as a read latency (RL) parameter (or simply RL for ease of description). More particularly, RL may refer to a time delay between issuing a read command and a moment the first piece of data from that read command is available on a data bus. Moreover, once the data has been transmitted via the bidirectional interface, the memory device may need to perform certain operations associated with bus turnaround to enable write commands via the read/write interface. In this regard, the read command 270 may further be associated with additional time parameters, such as a burst length timing parameter (sometimes referred to as BL/n), as indicated by reference number 278, and/or a postamble timing parameter (sometimes referred to as tWCKPST) divided by a clock cycle timing parameter (sometimes referred to as tCK), as indicated by reference number 280, among other examples. More particularly, in some implementations, after waiting a period of time associated with the RL and prior to issuing the write command 272, the memory system may be configured to wait a period of time corresponding to BL/n plus a round down (RD) of tWCKPST divided by tCK (shown in FIG. 2I as RD(tWCKPST/tCK)).

On the other hand, as shown by example 269, a tRTW associated with a write-only interface and a read-only interface may be associated with low latency because the bus turnaround constraints and/or parameters described above in connection with example 268 may not need to be accounted for at the memory system. More particularly, example 269 shows a time at which a read command 270 and a write command 272 arrive at the CA interface 274 (e.g., the common interface 222) in a memory system. Because in this example the read command 270 and write command 272 may be executed using different interfaces, the memory system may not need to account for certain delays, such as the delays associated with the RL, the BL/n, and/or the RD(tWCKPST/tCK), among other examples. Put another way, in this implementation, a read-to-write latency (e.g., tRTW) between commencing reading a set of host data associated with the read command 270 and commencing writing a set of host data associated with the write command 272 may be less than a sum of a read latency parameter (e.g., RL), a burst length timing parameter (e.g., BL/n), and a postamble timing parameter divided by a clock cycle timing parameter (e.g., RD(tWCKPST/tCK)). Instead, the read command 270 and the write command 272 may be issued back-to-back, as shown in FIG. 2I. In this regard, in some implementations a tRTW may be reduced to two times the clock cycle timing parameter (e.g., 2×tCK), as indicated by reference number 282.

Figure 2J:
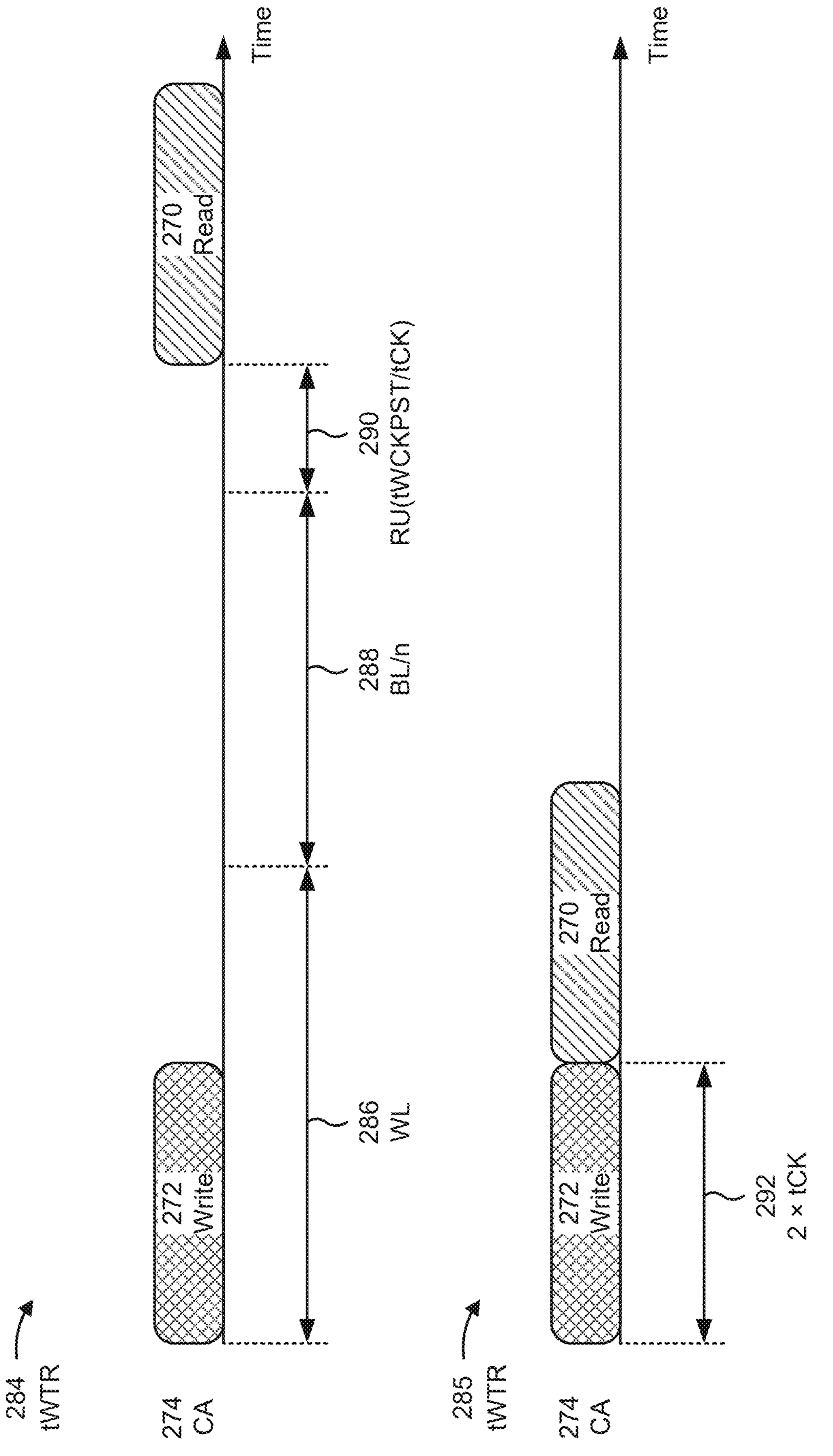

Similarly, FIG. 2J shows an example 284 associated with a write-to-read time (tWTR) associated with a memory device utilizing a bidirectional read/write interface (e.g., the read/write interface 232 described above in connection with FIG. 2D), and an example 285 associated with a tWTR associated with a memory device utilizing a write-only interface (e.g., the write-only interface 255 described above in connection with FIG. 2H) and a read-only interface (e.g., the read-only interface 259 described above in connection with FIG. 2H).

As shown by example 284, and in a similar manner as described above in connection with the tRTW latency of example 268, a tWTR associated with a bidirectional read/write interface may be associated with high latency, due to certain bus turnaround constraints and/or parameters that may need to be accounted for at the memory system. More particularly, example 284 shows a time at which the write command 272 and the read command 270 arrive at the CA interface 274 in a memory system. As indicated by reference number 286, the write command 272 in this example may be associated with a period of time used to complete the write operation, which is sometimes referred to as a write latency (WL) parameter (or simply WL for ease of description). More particularly, WL may refer to a time delay between issuing a write command and a moment the write operation begins. Moreover, once the data has been transmitted via the bidirectional interface, the memory device may need to perform certain operations associated with bus turnaround to enable read commands via the read/write interface. In this regard, the write command 272 may further be associated with additional time parameters, such as a burst length timing parameter (e.g., BL/n), as indicated by reference number 288, and/or a postamble timing parameter (e.g., tWCKPST) divided by a clock cycle timing parameter (e.g., tCK), as indicated by reference number 290, among other examples. More particularly, in some implementations, after waiting a period of time associated with the WL and prior to issuing the read command 270, the memory system may be configured to wait a period of time corresponding to BL/n plus a round up (RU) of tWCKPST divided by tCK (shown in FIG. 2J as RU(tWCKPST/tCK)).

On the other hand, as shown by example 285, a tWTR associated with a write-only interface and a read-only interface may be associated with low latency because the bus turnaround constraints and/or parameters described above in connection with example 284 may not need to be accounted for at the memory system. More particularly, example 285 shows a time at which a write command 272 and a read command 270 arrive at the CA interface 274 (e.g., the common interface 222) in a memory system. Because in this example the write command 272 and read command 270 may be executed using different interfaces, the memory device may not need to account for certain delays, such as the delays associated with the WL, the BL/n, and/or the RU(tWCKPST/tCK), among other examples. Put another way, in this implementation, a write-to-read latency (e.g., tWTR) between commencing writing a set of host data associated with the write command 272 and commencing reading a set of host data associated with the read command 270 may be less than a sum of a write latency parameter (e.g., WL), a burst length timing parameter (e.g., BL/n), and/or a postamble timing parameter divided by a clock cycle timing parameter (e.g., RU(tWCKPST/tCK)). Instead, the write command 272 and the read command 270 may be issued back-to-back, as shown in FIG. 2J. In this regard, in some implementations a tWTR may be reduced to two times the clock cycle timing parameter (e.g., 2×tCK), as indicated by reference number 292.

As indicated above, FIGS. 2A-2J are provided as an example. Other examples may differ from what is described with regard to FIGS. 2A-2J.

Figure 3:
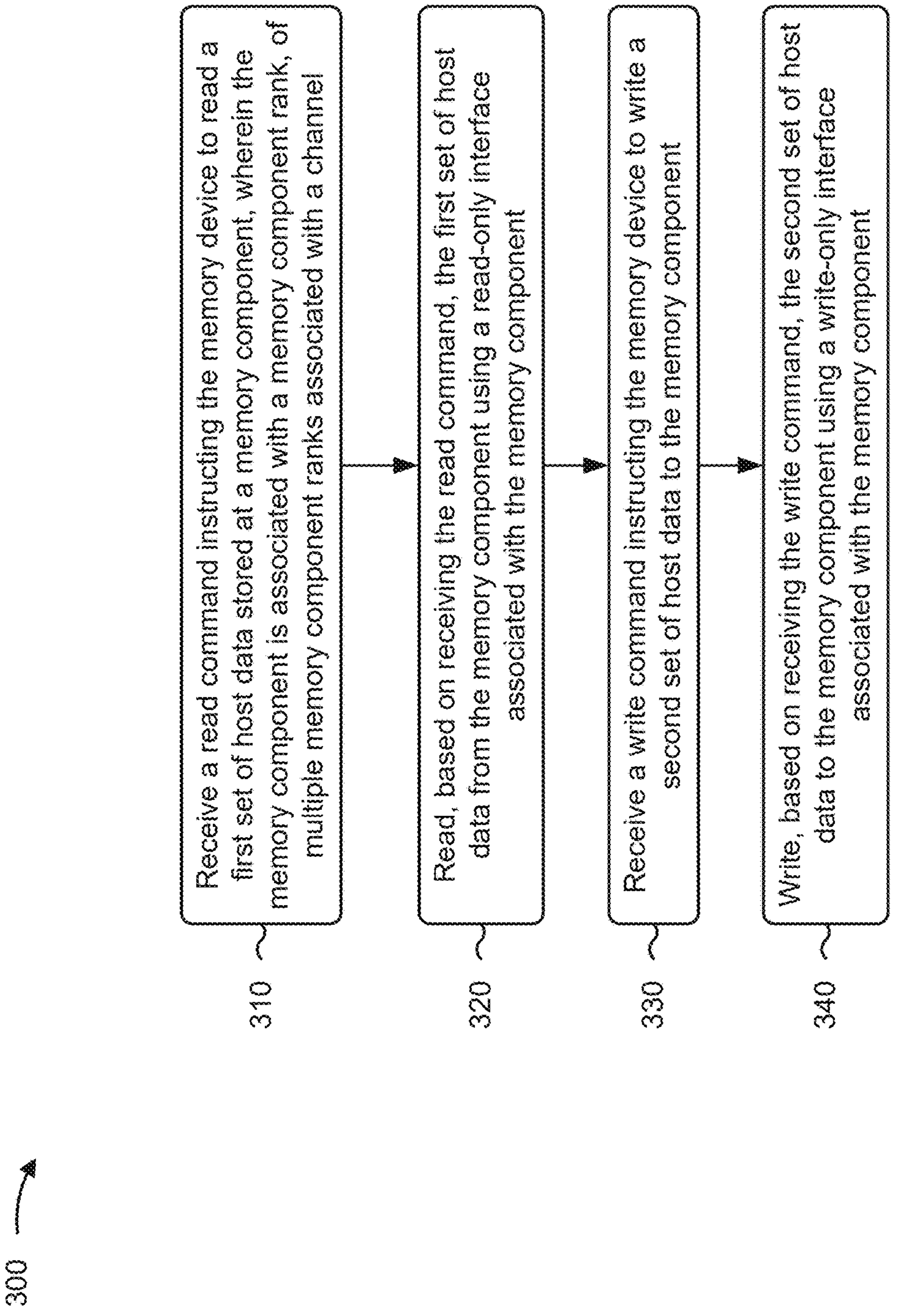
FIG. 3 is a flowchart of an example method associated with a full duplex memory system.

FIG. 3 is a flowchart of an example method 300 associated with a full duplex memory system. In some implementations, a memory device (e.g., the memory system 110 and/or the memory device 120) may perform or may be configured to perform the method 300. In some implementations, another device or a group of devices separate from or including the memory system and/or the memory device (e.g., the system 100) may perform or may be configured to perform the method 300. Additionally, or alternatively, one or more components of the memory system and/or the memory device (e.g., the memory system controller 115, the local controller 125, and/or the controller 202) may perform or may be configured to perform the method 300. Thus, means for performing the method 300 may include the memory system and/or the memory device and/or one or more components of the memory system and/or the memory device. Additionally, or alternatively, a non-transitory computer-readable medium may store one or more instructions that, when executed by the memory system and/or the memory device (e.g., the memory system controller 115 of the memory system 110), cause the memory system and/or the memory device to perform the method 300.

As shown in FIG. 3, the method 300 may include receiving a read command instructing the memory device to read a first set of host data stored at a memory component, wherein the memory component is associated with a memory component rank, of multiple memory component ranks associated with a channel (block 310). For example, the memory device may receive a read command instructing the memory device to read a first set of host data stored at a memory component 206 associated with a channel (e.g., channel 210). As further shown in FIG. 3, the method 300 may include reading, based on receiving the read command, the first set of host data from the memory component using a read-only interface associated with the memory component (block 320). For example, the memory device may read the first set of host data stored at the memory component 206 using the read-only interface described above in connection with reference number 252, the read-only interface 259, and/or a similar read-only interface. As further shown in FIG. 3, the method 300 may include receiving a write command instructing the memory device to write a second set of host data to the memory component (block 330). For example, the memory device may receive a write command instructing the memory device to write a second set of host data to the memory component 206. As further shown in FIG. 3, the method 300 may include writing, based on receiving the write command, the second set of host data to the memory component using a write-only interface associated with the memory component (block 340). For example, the memory device may write the second set of host data to the memory component 206 using the write-only interface described above in connection with reference number 250, the write-only interface 255, and/or a similar write-only interface.

The method 300 may include additional aspects, such as any single aspect or any combination of aspects described below and/or described in connection with one or more other methods or operations described elsewhere herein.

In a first aspect, the read-only interface is associated with a quantity of read-only data pins, and the write-only interface is associated with the quantity of write-only data pins. For example, in implementations in which the memory system is associated with a x8 configuration, the read-only interface may be associated with eight unidirectional DQ pins (as described above in connection with the read-only interface 259), and/or the write-only interface may be associated with eight unidirectional DQ pins (as described above in connection with the write-only interface 255).

In a second aspect, alone or in combination with the first aspect, the read-only interface is further associated with a first write clock true pin, a first write clock complementary pin, a read data strobe true pin, a read data strobe complementary pin, and an ECC pin, and the write-only interface is further associated with a second write clock true pin, a second write clock complementary pin, and a data mask inversion/ECC pin. For example, the read-only interface may be associated with WCK_t pin, a WCK_c pin, a RDQS_t pin, a RDQS_c pin, and/or an ECC pin, as described above in connection with the read-only interface 259, and/or the write-only interface may be associated with another WCK_t pin, another WCK_c pin, and/or DMI/ECC pin, as described above in connection with the write-only interface 255.

In a third aspect, alone or in combination with one or more of the first and second aspects, reading the first set of host data from the memory component using the read-only interface includes reading the first set of host data from a first bank of the memory component, writing the second set of host data to the memory component using the write-only interface includes writing the second set of host data to a second bank of the memory component, and writing the second set of host data to the second bank of the memory component at least partially overlaps in time with reading the first set of host data from the first bank of the memory component. For example, the read command may instruct the memory device to read the first set of host day from a first bank 216 of the memory component 206, the write command may instruct the memory device to write the second set of host data to a second bank 216 of the memory component 206, and thus the memory device may write the second set of host data to the second bank using the write-only interface described above in connection with reference number 250, the write-only interface 255, and/or a similar write-only interface, concurrently with reading the first set of host data from the first bank 216 of the memory component 206 using the read-only interface described above in connection with reference number 252, the read-only interface 259, and/or a similar read-only interface, thereby reducing latency associated with read and write operations, as described.

In a fourth aspect, alone or in combination with one or more of the first through third aspects, the method 300 includes at least one of writing the second set of host data subsequent to reading the first set of host data, wherein a read-to-write latency between commencing reading the first set of host data and commencing writing the second set of host data is less than a sum of a read latency parameter, a burst length timing parameter, and a postamble timing parameter divided by a clock cycle timing parameter, or reading the first set of host data subsequent to writing the second set of host data, wherein a write-to-read latency between commencing writing the second set of host data and commencing reading the first set of host data is less than a sum of a write latency parameter, the burst length timing parameter, and the postamble timing parameter divided by the clock cycle timing parameter. For example, a tRTW associated with the memory device may be approximately equal to 2×tCK and/or may be less than a sum of RL, BL/n, and/or RD(tWCKPST/tCK), as described above in connection with FIG. 2I, and/or a tWTR associated with the memory device may be approximately equal to 2×tCK and/or may be less than a sum of WL, BL/n, and/or RU(tWCKPST/tCK), as described above in connection with FIG. 2J.

In a fifth aspect, alone or in combination with one or more of the first through fourth aspects, the memory device is a low power double data rate memory device. For example, the memory device may be an LPDDR5 device, or similar LPDDRx device.

In a sixth aspect, alone or in combination with one or more of the first through fifth aspects, the memory device is a compute express link compliant memory device. For example, the memory device may include a PCIe/CXL interface and/or may operate using one or more of a CXL.io protocol, a CXL.cache protocol, or a CXL.mem protocol, among other examples.

Although FIG. 3 shows example blocks of a method 300, in some implementations, the method 300 may include additional blocks, fewer blocks, different blocks, or differently arranged blocks than those depicted in FIG. 3. Additionally, or alternatively, two or more of the blocks of the method 300 may be performed in parallel. The method 300 is an example of one method that may be performed by one or more devices described herein. These one or more devices may perform or may be configured to perform one or more other methods based on operations described herein.

In some implementations, a memory device includes one or more components configured to: receive, from a host system, a read command instructing the memory device to read a first set of host data stored at a memory component, wherein the memory component is associated with a memory component rank, of multiple memory component ranks associated with a channel; and read, via the channel and based on receiving the read command, the first set of host data from the memory component using a read-only interface associated with the memory component, wherein the memory component is associated with the read-only interface and a separate write-only interface.

In some implementations, a method includes receiving, by a memory device from a host system, a read command instructing the memory device to read a first set of host data stored at a memory component, wherein the memory component is associated with a memory component rank, of multiple memory component ranks associated with a channel; reading, by the memory device via the channel and based on receiving the read command, the first set of host data from the memory component using a read-only interface associated with the memory component; receiving, by the memory device from the host system, a write command instructing the memory device to write a second set of host data to the memory component; and writing, by the memory device via the channel and based on receiving the write command, the second set of host data to the memory component using a write-only interface associated with the memory component.

In some implementations, a CXL compliant memory device includes a controller; and a media subsystem in communication with the controller via multiple channels, wherein each channel, of the multiple channels, is associated with multiple DRAM components arranged in multiple DRAM component ranks, wherein the controller is configured to: receive, from a host system, a read command instructing the CXL compliant memory device to read a first set of host data stored at a DRAM component, of the multiple DRAM components, associated with a first channel, of the multiple channels; read, via the first channel and based on receiving the read command, the first set of host data from the DRAM component using a read-only interface associated with the DRAM component; receive, from the host system, a write command instructing the CXL compliant memory device to write a second set of host data to the DRAM component; and write, via the first channel and based on receiving the write command, the second set of host data to the DRAM component using a write-only interface associated with the DRAM component.

The foregoing disclosure provides illustration and description but is not intended to be exhaustive or to limit the implementations to the precise forms disclosed. Modifications and variations may be made in light of the above disclosure or may be acquired from practice of the implementations described herein.

As used herein, the terms "substantially" and "approximately" mean "within reasonable tolerances of manufacturing and measurement."

Even though particular combinations of features are recited in the claims and/or disclosed in the specification, these combinations are not intended to limit the disclosure of implementations described herein. Many of these features may be combined in ways not specifically recited in the claims and/or disclosed in the specification. For example, the disclosure includes each dependent claim in a claim set in combination with every other individual claim in that claim set and every combination of multiple claims in that claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

When "a component" or "one or more components" (or another element, such as "a controller" or "one or more controllers") is described or claimed (within a single claim or across multiple claims) as performing multiple operations or being configured to perform multiple operations, this language is intended to broadly cover a variety of architectures and environments. For example, unless explicitly claimed otherwise (e.g., via the use of "first component" and "second component" or other language that differentiates components in the claims), this language is intended to cover a single component performing or being configured to perform all of the operations, a group of components collectively performing or being configured to perform all of the operations, a first component performing or being configured to perform a first operation and a second component performing or being configured to perform a second operation, or any combination of components performing or being configured to perform the operations. For example, when a claim has the form "one or more components configured to: perform X; perform Y; and perform Z," that claim should be interpreted to mean "one or more components configured to perform X; one or more (possibly different) components configured to perform Y; and one or more (also possibly different) components configured to perform Z."

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Where only one item is intended, the phrase "only one," "single," or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. As used herein, the term "multiple" can be replaced with "a plurality of" and vice versa. Also, as used herein, the term "or" is intended to be inclusive when used in a series and may be used interchangeably with "and/or," unless explicitly stated otherwise (e.g., if used in combination with "either" or "only one of").

What is claimed is:

1. A memory device, comprising:

one or more components configured to:

receive, from a host system, a read command instructing the memory device to read a first set of host data stored at a memory component, wherein the memory component is associated with a memory component rank, of multiple memory component ranks associated with a channel, and wherein the memory component is associated with a read-only interface and a write-only interface;

read, via the channel and based on receiving the read command, the first set of host data from the memory component using the read-only interface associated with the memory component;

receive, from the host system, a write command instructing the memory device to write a second set of host data to the memory component; and write the second set of host data subsequent to reading the first set of host data, wherein a read-to-write latency is less than a sum of a read latency parameter, a burst length timing parameter, and a postamble timing parameter divided by a clock cycle timing parameter.

2. The memory device of claim 1, wherein the read-only interface is associated with a quantity of read-only data pins, and wherein the write-only interface is associated with the quantity of write-only data pins.

3. The memory device of claim 2, wherein the read-only interface is further associated with a first write clock true pin, a first write clock complementary pin, a read data strobe true pin, a read data strobe complementary pin, and an error correction code (ECC) pin, and wherein the write-only interface is further associated with a second write clock true pin, a second write clock complementary pin, and a data mask inversion/ECC pin.

4. The memory device of claim 1, wherein the one or more components, to read the first set of host data from the memory component using the read-only interface, are configured to read the first set of host data from a first bank of the memory component, wherein the one or more components are further configured to receive, from the host system, a write command instructing the memory device to write a second set of host data to the memory component and write the second set of host data to the memory component using the write-only interface, wherein the one or more components, to write the second set of host data to the memory component using the write-only interface, are configured to write the second set of host data to a second bank of the memory component, and wherein writing the second set of host data to the second bank of the memory component at least partially overlaps in time with reading the first set of host data from the first bank of the memory component.

5. The memory device of claim 1, wherein the read-to-write latency defines a time period between commencing reading the first set of host data and commencing writing the second set of host data.

6. The memory device of claim 1, wherein the memory device is a low power double data rate memory device.

7. The memory device of claim 1, wherein the memory device is a compute express link compliant memory device.

8. A method, comprising:

receiving, by a memory device from a host system, a read command instructing the memory device to read a first set of host data stored at a memory component, wherein the memory component is associated with a memory component rank, of multiple memory component ranks associated with a channel;

reading, by the memory device via the channel and based on receiving the read command, the first set of host data from the memory component using a read-only interface associated with the memory component;

receiving, by the memory device from the host system, a write command instructing the memory device to write a second set of host data to the memory component using a write-only interface associated with the memory component; and reading the first set of host data subsequent to writing the second set of host data, wherein a write-to-read latency is less than a sum of a write latency parameter, a burst length timing parameter, and a postamble timing parameter divided by a clock cycle timing parameter.

9. The method of claim 8, wherein the read-only interface is associated with a quantity of read-only data pins, and wherein the write-only interface is associated with the quantity of write-only data pins.

10. The method of claim 9, wherein the read-only interface is further associated with a first write clock true pin, a first write clock complementary pin, a read data strobe true pin, a read data strobe complementary pin, and an error correction code (ECC) pin, and wherein the write-only interface is further associated with a second write clock true pin, a second write clock complementary pin, and a data mask inversion/ECC pin.

11. The method of claim 8, wherein reading the first set of host data from the memory component using the read-only interface includes reading the first set of host data from a first bank of the memory component, wherein writing the second set of host data to the memory component using the write-only interface includes writing the second set of host data to a second bank of the memory component, and wherein writing the second set of host data to the second bank of the memory component at least partially overlaps in time with reading the first set of host data from the first bank of the memory component.

12. The method of claim 8, wherein the write-to-read latency defines a time period between commencing writing the second set of host data and commencing reading the first set of host data.

13. The method of claim 8, wherein the memory device is a low power double data rate memory device.

14. The method of claim 8, wherein the memory device is a compute express link compliant memory device.

15. A compute express link (CXL) compliant memory device, comprising:

a controller; and a media subsystem in communication with the controller via multiple channels, wherein each channel, of the multiple channels, is associated with multiple dynamic random access memory (DRAM) components arranged in multiple DRAM component ranks, wherein the controller is configured to:

receive, from a host system, a read command instructing the CXL compliant memory device to read a first set of host data stored at a DRAM component, of the multiple DRAM components, associated with a first channel, of the multiple channels;

read, via the first channel and based on receiving the read command, the first set of host data from the DRAM component using a read-only interface associated with the DRAM component;

receive, from the host system, a write command instructing the CXL compliant memory device to write a second set of host data to the DRAM component using a write-only interface associated with the DRAM component; and write the second set of host data subsequent to reading the first set of host data, wherein a read-to-write latency is less than a sum of a read latency parameter, a burst length timing parameter, and a postamble timing parameter divided by a clock cycle timing parameter.

16. The CXL compliant memory device of claim 15, wherein the read-only interface is associated with a quantity of read-only data pins, and wherein the write-only interface is associated with the quantity of write-only data pins.

17. The CXL compliant memory device of claim 16, wherein the read-only interface is further associated with a first write clock true pin, a first write clock complementary pin, a read data strobe true pin, a read data strobe complementary pin, and an error correction code (ECC) pin, and wherein the write-only interface is further associated with a second write clock true pin, a second write clock complementary pin, and a data mask inversion/ECC pin.

18. The CXL compliant memory device of claim 15, wherein the controller, to read the first set of host data from the DRAM component using the read-only interface, is configured to read the first set of host data from a first bank of the DRAM component, wherein the controller, to write the second set of host data to the DRAM component using the write-only interface, is configured to write the second set of host data to a second bank of the DRAM component, and wherein writing the second set of host data to the second bank of the DRAM component at least partially overlaps in time with reading the first set of host data from the first bank of the DRAM component.

19. The CXL compliant memory device of claim 15, wherein the read-to-write latency defines a time period between commencing reading the first set of host data and commencing writing the second set of host data.

20. The CXL compliant memory device of claim 15, wherein the CXL compliant memory device is a low power double data rate memory device.

* * * * *